(12) United States Patent
Tanahashi et al.

(10) Patent No.: US 6,525,144 B1
(45) Date of Patent: Feb. 25, 2003

(54) NORBORNENE POLYMER AND PRODUCTION PROCESS

(75) Inventors: Naoki Tanahashi, Kanagawa (JP); Hidehiro Ito, Kanagawa (JP); Toshihide Murakami, Kanagawa (JP)

(73) Assignee: Nippon Zeon Co., Ltd., Tokyo (JP)

( * ) Notice: Subject to any disclaimer, the term of this patent is extended or adjusted under 35 U.S.C. 154(b) by 0 days.

(21) Appl. No.: 09/485,899

(22) PCT Filed: Aug. 19, 1998

(86) PCT No.: PCT/JP98/03877
§ 371 (c)(1),
(2), (4) Date: May 5, 2000

(87) PCT Pub. No.: WO99/09085
PCT Pub. Date: Feb. 25, 1999

(30) Foreign Application Priority Data

Aug. 19, 1997 (JP) ............................................. 9-237649

(51) Int. Cl.⁷ .................................................. C08F 8/04
(52) U.S. Cl. ..................... 525/332.1; 525/338; 525/334
(58) Field of Search .............................. 525/332.1, 338, 525/339

(56) References Cited

U.S. PATENT DOCUMENTS

| 5,093,441 A | 3/1992 | Sjardijn et al. |
| 5,319,966 A | 6/1994 | Jackson et al. |
| 5,468,803 A | 11/1995 | Takahashi et al. |
| 5,681,900 A | 10/1997 | Murakami et al. |

FOREIGN PATENT DOCUMENTS

| EP | 0430585 | 6/1991 |
| EP | 0499226 | 2/1992 |
| EP | 0784066 | 7/1997 |
| JP | 58-43412 | 3/1983 |
| JP | 60-026024 | 2/1985 |
| JP | 64-24826 | 1/1989 |
| JP | 2-133406 | 5/1990 |
| JP | 2-255715 | 10/1990 |
| JP | 2-305814 | 12/1990 |
| JP | 3-074409 | 3/1991 |
| JP | 3-0722512 | 3/1991 |
| JP | 3-95235 | 4/1991 |
| JP | 3-220230 | 9/1991 |
| JP | 4-063807 | 2/1992 |
| JP | 4-276253 | 10/1992 |
| JP | 4-276537 | 10/1992 |
| JP | 5-097719 | 4/1993 |
| JP | 5-317411 | 12/1993 |
| JP | 6-248164 | 9/1994 |
| JP | 7-041550 | 2/1995 |
| JP | 7-053680 | 2/1995 |
| JP | 1-138257 | 5/1995 |
| JP | 7-179575 | 7/1995 |
| JP | 8-072210 | 3/1996 |
| WO | WO9610596 | 11/1996 |

OTHER PUBLICATIONS

Kodemura et al, *Polymer Journal*, 27(2):1167–1172 (1995).
Gilliom et al, *J. Am. Chem. Soc.*, 108, 733–742 (1986).
Nguyen et al. *J. Am. Chem. Soc.*, 115, 9858–9859 (1993).
Schwab et al, *J. Am. Chem. Soc.*, 118, 100–110 (1996).

Primary Examiner—Bernard Lipman
(74) Attorney, Agent, or Firm—Dinsmore & Shohl LLP

(57) ABSTRACT

A norbornene polymer comprising a repeating unit derived from a norbornene monomer having a cyclic hydrocarbon structure (I) derived from the norbornene ring which constitutes at least a part of the main chain, another cyclic hydrocarbon structure (II), which shares one carbon-carbon bond with the cyclic hydrocarbon structure (I) and has 4 to 6 carbon atoms, and a monocyclic or polycyclic hydrocarbon structure (III), which shares one carbon-carbon bond with the cyclic hydrocarbon structure (II), in a proportion of 20 to 100 mol % based on the whole repeating unit of the polymer, wherein the number average molecular weight is within a range of 1,000 to 1,000,000, and a peak area (A) on a high magnetic field side and a peak area (B) on a low magnetic field side in methylene peaks derived from the methylene groups in the cyclic hydrocarbon structure (III) in a $^{13}$C-NMR spectrum as determined in heavy chloroform (TMS standard) satisfy a relationship of the expression:

$$B/(A+B) \leq 0.30$$

and a production process thereof.

31 Claims, 1 Drawing Sheet

NORBORNENE POLYMER AND PRODUCTION PROCESS

TECHNICAL FIELD

The present invention relates to novel norbornene polymers, and a production process thereof. The norbornene polymers according to the present invention are excellent in heat resistance and can provide molded or formed products extremely small in distortion at high temperature. The present invention also relates to molding materials comprising such a norbornene polymer and molded or formed products making use of such a molding material.

BACKGROUND ART

Thermoplastic norbornene polymers such as tetracyclododecene ring-opening polymers and hydrogenated products thereof are excellent in optical properties such as transparency and low birefringence, weathering properties such as moisture resistance and heat resistance, and electrical properties such as low dielectric constant and low dielectric loss tangent and are hence used as molding materials in various application fields making good use of these properties.

For example, in Japanese Patent Application Laid-Open Nos. 276253/1992, 276537/1992 and 317411/1993, and U.S. Pat. No. 5,468,803, it is reported that thermoplastic norbornene resins are excellent in gas barrier property, low in moisture permeability and little in substances dissolved out and are hence suitable for medical equipments.

In Japanese Patent Application Laid-Open Nos. 138257/1989, 63807/1992 and 41550/1995, it is reported that thermoplastic norbornene resins are excellent in electrical properties such as dielectric constant and dielectric loss tangent, and low in dependence of these electrical properties on temperature and frequency, and are hence suitable for use as electrical insulating materials. In particular, it is reported in Japanese Patent Application Laid-Open No. 63807/1992 that when a thermoplastic norbornene resin is used as a capacitor film, a miniaturized capacitor having high capacitance is provided.

International Publication WO96/10596 discloses that of such thermoplastic norbornene resins, hydrogenated products of norbornene ring-opening polymers obtained by subjecting a norbornene monomer having an aromatic ring in its fused polycyclic structure, such as 1,4-methano-1,4,4a,9a-tetrahydrofluorene (MTF), to ring-opening polymerization and then hydrogenating the resultant ring-opening polymer to saturate the double bond in the main chain and convert the aromatic rings into cyclohexane rings are low in birefringence and excellent in resistance to deterioration by oils and greases compared with the conventional thermoplastic norbornene resins and are hence useful in such various uses as described above, including optical materials. Japanese Patent Application Laid-Open No. 220230/1991 discloses that hydrogenated products of norbornene ring-opening polymers obtained by subjecting a norbornene monomer having a cyclohexene ring in its fused polycyclic structure, such as 1,4-methano-1,4,4a,4b,5,8,8a,9a-octahydro-9H-fluorene (MOF), to ring-opening polymerization and then hydrogenating the resultant ring-opening polymer to saturate the double bond in the main chain and convert the cyclohexene rings into cyclohexane rings are also transparency and low birefringence and are hence suitable for use as optical materials.

As described above, the norbornene polymers having a cyclohexane ring in its fused polycyclic structure constituting a repeating unit are resin materials having characteristics such as low birefringence and excellent transparency and resistance to deterioration by oils and greases. However, the conventionally known norbornene polymers have a glass transition temperature (Tg) of at most about 140° C., and so their heat resistance has not been insufficient. When another copolymerizable monomer is copolymerized with a norbornene monomer, for example, upon production of a ring-opening polymer in order to improve the processability and strength properties of the resulting norbornene polymer, there has been a problem that Tg of the hydrogenated product of the ring-opening copolymer finally obtained is lower than Tg of the hydrogenated product of the homopolymer of such a norbornene monomer. Accordingly, the norbornene polymers having a cyclohexane ring in its fused polycyclic structure constituting a repeating unit have been difficult to meet strict requirements of heat resistance in recent years.

DISCLOSURE OF THE INVENTION

It is an object of the present invention to provide a norbornene polymer excellent in heat resistance and extremely small in distortion at high temperature, and a production process thereof.

Another object of the present invention is to provide a molding material comprising such a norbornene polymer and a molded or formed product formed of such a molding material.

The present inventors have carried out an extensive investigation with a view toward obtaining norbornene polymers having greatly improved heat resistance while retaining properties such as excellent transparency, low birefringence and resistance to oils and greases inherent in the norbornene polymers having a cyclohexane ring in its fused polycyclic structure constituting a repeating unit. As a result, it has been found that the compositional ratio of stereoisomerism (endo-exo isomerism) of a norbornene monomer having a fused polycyclic structure containing a norbornene ring is controlled to conduct ring-opening polymerization or addition polymerization using a norbornene monomer containing at least 50 mol % of endo form, and hydrogenation is then performed under comparatively moderate temperature conditions, thereby obtaining a norbornene polymer having excellent heat resistance without impairing other properties.

The norbornene polymers according to the present invention can be identified by performing $^{13}$C-NMR spectrum analysis to determine areas of both methylene peaks on high magnetic field and low magnetic field sides, which are derived from the methylene groups in cycloalkane (for example, cyclohexane ring) formed by hydrogenating an aromatic ring or cycloalkene in the fused polycyclic structure, and calculating out a peak area ratio thereof. The norbornene polymers according to the present invention may be those derived from copolymers of the above-described norbornene monomer and another monomer copolymerizable therewith.

The norbornene polymers according to the present invention may be used as molding materials by compounding fillers, stabilizers, other thermoplastic resins, rubbery polymers and/or the like as needed. The molding materials according to the present invention can be formed into various kinds of molded or formed products such as medical equipments, optical members, electrical insulating members and electronic part treating equipments.

The present invention has been led to completion on the basis of these findings.

According to the present invention, there is thus provided a norbornene polymer comprising a repeating unit derived from a norbornene monomer having a cyclic hydrocarbon structure (I) derived from the norbornene ring which constitutes at least a part of the main chain, another cyclic hydrocarbon structure (II), which shares one carbon-carbon bond with the cyclic hydrocarbon structure (I) and has 4 to 6 carbon atoms, and a monocyclic or polycyclic hydrocarbon structure (III), which shares one carbon-carbon bond with the cyclic hydrocarbon structure (II), in a proportion of 20 to 100 mol % based on the whole repeating unit of the polymer, wherein the number average molecular weight is within a range of 1,000 to 1,000,000, and a peak area (A) on a high magnetic field side and a peak area (B) on a low magnetic field side in methylene peaks derived from the methylene groups in the cyclic hydrocarbon structure (III) in a $^{13}$C-NMR spectrum as determined in heavy chloroform (TMS standard) satisfy a relationship of the expression:

$$B/(A+B) \leq 0.30$$

According to the present invention, there is also provided a process for producing the above-described norbornene polymer, which comprises polymerizing a monomer or monomer mixture comprising 20 to 100 mol % of a norbornene monomer (1) of a fused polycyclic structure having a norbornene ring structure (IA), a cyclic hydrocarbon structure (IIA), which shares one carbon-carbon bond with the norbornene ring structure (IA) and has 4 to 6 carbon atoms, and a monocyclic or polycyclic hydrocarbon structure (IIIA), which shares one carbon-carbon bond with the cyclic hydrocarbon structure (IIA) and has at least one carbon-carbon unsaturated bond in its ring, the compositional ratio (a:b) between an endo form (a) and an exo form (b) which are stereoisomers of said norbornene monomer being within a range of 70:30 to 100:0, and 0 to 80 mol % of any other monomer (ii) copolymerizable with the norbornene monomer, and then hydrogenating the resultant polymer.

According to the present invention, there are further provided a molding material comprising the above-described norbornene polymer, and a molded or formed product formed of the molding material.

BEST MODE FOR CARRYING OUT THE INVENTION

Norbornene Polymer

Figure 1:
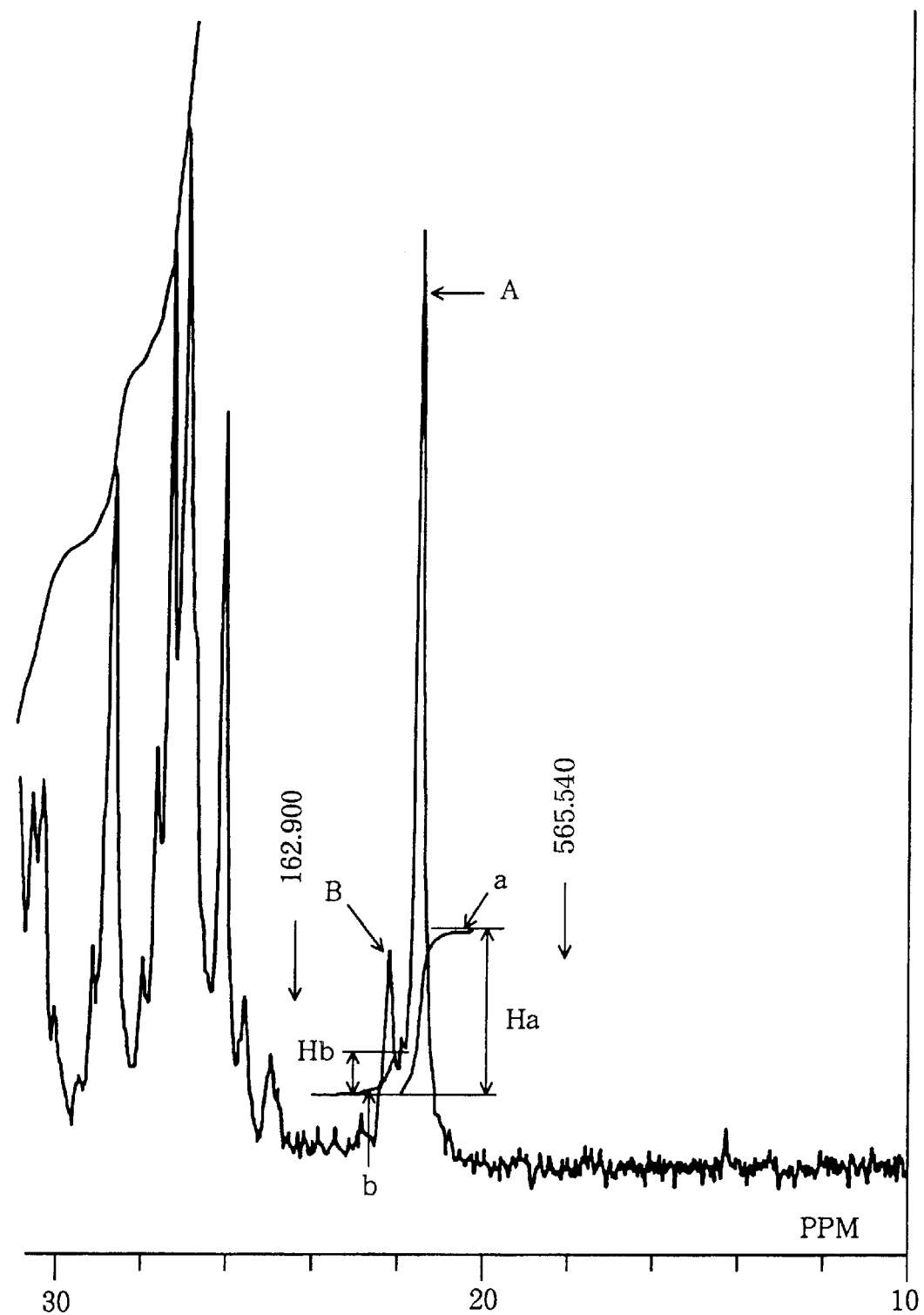
FIG. 1 illustrates a part of a $^{13}$C-NMR spectrum of a hydrogenated product of a 1,4-methano-1,4,-4a,9a-tetrahydrofluorene (MTF) ring-opening polymer.

The norbornene polymers according to the present invention are norbornene polymers comprising a repeating unit derived from a norbornene monomer having a cyclic hydrocarbon structure (I) derived from the norbornene ring which constitutes at least a part of the main chain, another cyclic hydrocarbon structure (II), which shares one carbon-carbon bond with the cyclic hydrocarbon structure (I) and has 4 to 6 carbon atoms, and a monocyclic or polycyclic hydrocarbon structure (III), which shares one carbon-carbon bond with the cyclic hydrocarbon structure (II), in a proportion of 20 to 100 mol % based on the whole repeating unit of the polymer. However, the norbornene polymers according to the present invention have a number average molecular weight ranging from 1,000 to 1,000,000, and a peak area (A) on a high magnetic field side and a peak area (B) on a low magnetic field side in methylene peaks derived from the methylene groups in the cyclic hydrocarbon structure (III) in a $^{13}$C-NMR spectrum as determined in heavy chloroform (TMS standard) satisfy a relationship of the expression:

$$B/(A+B) \leq 0.30$$

The repeating unit derived from the norbornene monomer includes a repeating unit obtained by subjecting a norbornene monomer to ring-opening (co)polymerization or addition (co)polymerization, and then hydrogenating the resultant (co)polymer to saturate unsaturated bonds, and a repeating unit obtained by conducting a modification reaction, for example, a graft reaction before or after the hydrogenation reaction.

The norbornene polymers according to the present invention can be obtained by polymerizing a monomer or monomer mixture comprising 20 to 100 mol % of a norbornene monomer (i) of a fused polycyclic structure having a norbornene ring structure (IA), a cyclic hydrocarbon structure (IIA), which shares one carbon-carbon bond with the norbornene ring structure (IA) and has 4 to 6 carbon atoms, and a monocyclic or polycyclic hydrocarbon structure (IIIA), which shares one carbon-carbon bond with the cyclic hydrocarbon structure (IIA) and has at least one carbon-carbon unsaturated bond in its ring, and 0 to 80 mole of any other monomer (ii) copolymerizable with the norbornene monomer, and then hydrogenating the resultant polymer. In order to provide a norbornene polymer satisfying the requirement of the methylene peak area ratio, it is necessary to use, as the norbornene monomer (i) having the fused polycyclic structure, a norbornene monomer the compositional ratio (a:b) of an endo form (a) to an exo form (b) of which falls within a range of 70:30 to 100:0.

Specific examples of the norbornene polymers according to the present invention include hydrogenated products of norbornene polymers obtained by subjecting a norbornene monomer having an aromatic ring in its fused polycyclic structure, such as 1,4-methano-1,4,4a,9a-tetrahydrofluorene (MTF), to ring-opening polymerization or addition polymerization, and then hydrogenating the resultant polymer to convert the aromatic rings into cycloalkanes such as cyclohexane rings, and hydrogenated products of norbornene polymers obtained by subjecting a norbornene monomer having a cyclohexene ring in its fused polycyclic structure, such as 1,4-methano-1,4,4a,4b,5,8,8a,9a-octahydro-9H-fluorene (MOF), to ring-opening polymerization or addition polymerization and then hydrogenating the resultant polymer to convert the cyclohexene rings into cyclohexane rings.

The repeating unit derived from the norbornene monomer is represented by the formula (1):

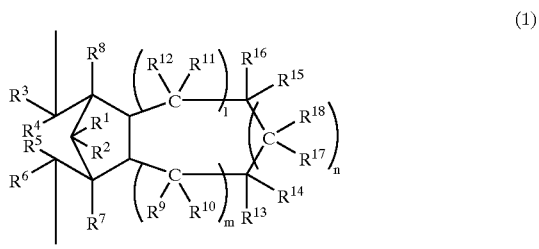

(1)

wherein the respective reference characters have the following meanings:

l and m are individually 0, 1 or 2;

n is 0, 1 or 2;

$l+m+n \leq 2$;

$R^1$, $R^2$ and $R^7$ to $R^{18}$ are independently a hydrogen atom, hydrocarbon group, halogen atom, hydroxyl group, ester group, alkoxy group, cyano group, amide group, imide group or silyl group, or a hydrocarbon group substituted by a polar group (a halogen atom, hydroxyl group, ester group, alkoxy group, cyano group, amide group, imide group or silyl group), with the proviso that:

$R^{14}$ and $R^{15}$ are bonded to each other to form a monocyclic or polycyclic hydrocarbon structure when n is 0;

any one or both of $R^{14}$ and $R^{17}$, and $R^{15}$ and $R^{18}$ are bonded to each other to form a monocyclic or polycyclic hydrocarbon structure when n is 1 or 2, provided that when both $R^{14}$ and $R^{17}$, and $R^{15}$ and $R^{18}$ are bonded to each other to form a cyclic hydrocarbon structure, the cyclic hydrocarbon structure may be a fused polycycle which shares at least one carbon-carbon bond with each other; and $R^3$ to $R^6$ are all hydrogen atoms, or $R^4$ and $R^5$ among them may form a single bond together, and in this case, both $R^3$ and $R^6$ are hydrogen atoms.

In the formula (1), the cyclic hydrocarbon structure located at the left end is a cyclic hydrocarbon structure (I) derived from the norbornene ring which constitutes at least a part of the main chain.

When $R^4$ and $R^5$ form a single bond together, such a repeating unit becomes a repeating unit derived from an addition (co)polymer of the norbornene monomer, and the formula (1) can be represented by the formula (1a):

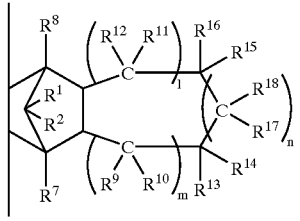

(1a)

wherein the respective reference characters have the same meanings as defined in the formula (1).

When $R^3$ to $R^6$ are all hydrogen atoms, such a repeating unit becomes a repeating unit derived from a ring-opening (co)polymer of the norbornene monomer, and the formula (1) can be represented by the formula (1b):

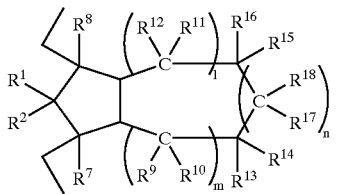

(1b)

wherein the respective reference characters have the same meanings as defined in the formula (1).

In the formula (1), the cyclic hydrocarbon structure adjacent to the cyclic hydrocarbon structure (I) derived from the norbornene ring is another cyclic hydrocarbon structure (II) which shares one carbon-carbon bond with the cyclic hydrocarbon structure (I) and has 4 to 6 carbon atoms. This cyclic hydrocarbon structure (II) generally has a saturated and fused alicyclic structure, and is preferably a 5-membered ring or 6-membered ring, more preferably a 5-membered ring.

When n is 0 in the formula (1), $R^{14}$ and $R^{15}$ are bonded to each other to form a monocyclic or polycyclic hydrocarbon structure. When n is 1 or 2, any one or both of $R^{14}$ and $R^{17}$, and $R^{15}$ and $R^{18}$ are bonded to each other to form a monocyclic or polycyclic hydrocarbon structure. When both $R^{14}$ and $R^{17}$ and $R^{15}$ and $R^{18}$ are bonded to each other to form a cyclic hydrocarbon structure, the cyclic hydrocarbon structure may be a fused polycycle. This monocyclic or polycyclic hydrocarbon structure is the monocyclic or polycyclic hydrocarbon structure (III) which shares one carbon-carbon bond with the cyclic hydrocarbon structure (II). The monocyclic or polycyclic hydrocarbon structure (III) generally has a saturated and fused alicyclic structure obtained by polymerizing a norbornene monomer of a fused polycyclic structure, which has the monocyclic or polycyclic structure (IIIA) having at least one carbon-carbon unsaturated bond in its ring, and then hydrogenating the resultant polymer. This cyclic hydrocarbon structure (III) is preferably a 6-membered ring (i.e., cyclohexane ring).

Examples of the halogen atom in the formula (1) include fluorine, chlorine, bromine and iodine atoms. Examples of the hydrocarbon group include alkyl groups having 1 to 20, preferably 1 to 10, more preferably 1 to 6 carbon atoms; alkenyl groups having 2 to 20, preferably 2 to 10, more preferably 2 to 6 carbon atoms; and cycloalkyl groups having 3 to 15, preferably 3 to 8, more preferably 5 or 6 carbon atoms. Examples of the hydrocarbon group substituted by a polar group include halogenated alkyl groups having 1 to 20, preferably 1 to 10, more preferably 1 to 6 carbon atoms. However, hydrocarbon groups having an unsaturated bond are generally converted into saturated hydrocarbon groups by hydrogenation.

The norbornene polymers according to the present invention may have repeating units derived from any other monomers in a proportion of 0 to 80 mol % in addition to the repeating unit represented by the formula (1) derived from the norbornene monomer. No particular limitation is imposed on the repeating units derived from the other monomers so far as they are repeating units derived from monomers copolymerizable with the above-described norbornene monomer. However, they are preferably repeating units derived from norbornene monomers such as tetracyclododecene, dicyclopentadiene, pentacyclopentadecene and pentacyclopentadecadiene from the viewpoints of heat resistance, strength properties and the like. Of these, repeating units derived from tetracyclododecene monomers having a cyclic hydrocarbon structure (IV) derived from the norbornene ring which constitutes at least a part of the main chain, and a norbornane structure (V) which shares one carbon-carbon bond with the cyclic hydrocarbon structure (IV) are particularly preferred. The other repeating units also include a repeating unit remaining unhydrogenated upon introduction of the repeating unit represented by the formula (1) derived from the norbornene monomer by the hydrogenation.

A preferable embodiment in the formula (1) is a repeating unit represented by the formula (1b) derived from a hydrogenated product of a ring-opening polymer of the norbornene monomer. A norbornene polymer having this repeating unit represented by the formula (1b) is preferred because it is excellent in balance between elastic modulus and elongation and has a melt viscosity suitable for use as a molding material.

In the formula (1), preferable embodiments are where l=0 and m=0, and more preferably where n=1. It is preferable that $R^{14}$ and $R^{17}$ form a cyclohexane ring structure, and $R^1$ to $R^{13}$, $R^{15}$, $R^{16}$ and $R^{18}$ are all hydrogen atoms.

The norbornene polymers according to the present invention have the repeating unit represented by the formula (1) in a proportion of 20 to 100 mol %, preferably 25 to 100 mol %, more preferably 30 to 100 mol %. If the proportion of the repeating unit represented by the formula (1) is extremely low, the heat resistance of the resulting polymer is impaired, so that distortion at high temperature become great. It is hence not preferable to use any polymer having the repeating unit represented by the formula (1) in such an extremely low proportion. ($^{13}$C-NMR spectrum)

The norbornene polymers according to the present invention must be such that a peak area (A) on a high magnetic field side and a peak area (B) on a low magnetic field side in methylene peaks derived from the methylene groups in the cyclic hydrocarbon structure (III) in a $^{13}$C-NMR spectrum as determined in heavy chloroform (TMS standard) satisfy a relationship of the expression:

$$B/(A+B) \leq 0.30$$

A methylene peak derived from the methylene groups in the cyclic hydrocarbon structure (III) as determined by $^{13}$C-NMR splits into two peaks by a difference in steric structure of the repeating unit derived from the norbornene monomer. This difference in steric structure is caused by the endo-exo isomerism of the repeating unit derived from the norbornene monomer, and in its turn by the endo-exo isomerism of the norbornene monomer used.

When a norbornene monomer of a fused polycyclic structure, which has the monocyclic or polycyclic structure (IIIA) having at least one carbon-carbon unsaturated bond in its ring, is polymerized, and the carbon-carbon unsaturated bond in this ring is then hydrogenated, a new peak derived from the methylene groups in the ring, which are not present in the polymer before the hydrogenation, appears in the state split into two peaks. As a specific example, a chart of a $^{13}$C-NMR spectrum (TMS standard) as determined in heavy chloroform where the norbornene polymer is a hydrogenated product of a ring-opening homopolymer of 1,4-methano-1,4,4a,9a-tetrahydrofluorene is as illustrated in FIG. 1.

The respective reference characters in FIG. 1 have the following meaning:

A: Peak A derived form the methylene group;
B: Peak B derived form the methylene group;
a: Integrated curve of Peak A;
b: Integrated curve of Peak B;
Ha: Height corresponding to a peak area value of Peak A;
Hb: Height corresponding to a peak area value of Peak B.

As illustrated in FIG. 1, an optional methylene peak in the cyclohexane ring in the repeating unit formed by the hydrogenation splits on a high magnetic field side (A) and a low magnetic field side (B) according to the configuration of 6 kinds of methine carbon, and the two peaks appear at 21–22 ppm and 22–22.5 ppm, respectively.

The calculated values (A) and (B) of areas of these methylene peaks A and B are expressed by the values of heights (Ha) and (Hb) of Integrated curves (a) and (b) of the respective peaks in FIG. 1. Therefore, an area ratio of the peak area (A) on a high magnetic field side to the peak area (B) on a low magnetic field side in the methylene peaks is calculated out in the following manner based on the data in FIG. 1.

$$B/(A+B) = Hb/(Ha+Hb)$$
$$= 162.900/(595.540+162.900)$$
$$= 0.2236$$

When the kind of the norbornene monomer used is changed, the position of a peak derived from the methylene groups is different from the case in FIG. 1. In any case, however, the peak splits on the high magnetic field and low magnetic field sides. The positions of the two pair of peaks split can be identified, since they appear at the highest magnetic field side within the measuring range of the $^{13}$C-NMR chart as a pair of split peeks. Accordingly, the area ratios as to all the norbornene polymers can be found by the calculation based on the date of the Integrated curve.

The width of these peak areas correlates with the heat resistance of the norbornene polymers. When the area ratio (integral ratio) of the split methylene peaks satisfy the relationship of $B/(A+B) \leq 0.30$, preferably $B/(A+B) \leq 0.25$, more preferably $B/(A+B) \leq 0.20$, the heat resistance of the norbornene polymer becomes excellent. If the B/(A+B) value is extremely high, the heat resistance of the norbornene polymer is lowered, so that distortion of the resulting molded or formed product at high temperature become great.

The norbornene polymers according to the present invention has a number average molecular weight (Mn) of generally 1,000 to 1,000,000, preferably from 5,000 to 500,000, more preferably from 10,000 to 200,000 in terms of polyisoprene as measured by gel permeation chromatography (GPC) using cyclohexane as a solvent. If the number average molecular weight (Mn) of the norbornene polymer is extremely low, its strength properties become insufficient. If the Mn is extremely high, its flowability becomes poor, so that its molding becomes difficult.

No particular limitation is imposed on the molecular weight distribution of the norbornene polymer expressed by a ratio (Mw/Mn) of the weight average molecular weight (Mw) to the number average molecular weight (Mn). However, it is generally 1.5 to 5.0, preferably 1. 5 to 3.0, more preferably 1.5 to 2.5.

When the norbornene monomer is subjected to ring-opening (co)polymerization, a carbon-carbon double bond is formed in the main chain. However, the double bond is saturated by hydrogenation. The proportion of the repeating unit having a carbon-carbon double bond in the main chain structure of the norbornene polymer is generally at most 20 mol %, preferably at most 10 mol %, more preferably at most 2 mol %. If the proportion of the repeating unit having a carbon-carbon double bond in the main chain structure is extremely high, the resistance to deterioration on weathering and resistance to deterioration by light of such a polymer becomes poor. It is hence not preferable to contain the repeating unit having a carbon-carbon double bond in the main chain structure in such a high proportion.

The proportion of repeating units having at least one carbon-carbon unsaturated bond in its ring, i.e., unhydrogenated repeating units, is generally at most 50 mol %, preferably at most 30 mol %, more preferably at most 10 mol %. In many cases, the ring-opening (co)polymer is hydrogenated until the proportion of the unhydrogenated repeating units amounts to substantially 0 mol %. If the proportion of the repeating units having at least one carbon-carbon unsaturated bond in its ring is extremely high, the heat resistance of such a polymer is deteriorated. It is hence not preferable to contain such repeating units in such a high proportion.

Since the glass transition temperature (Tg) of a norbornene polymer is related to heat resistance, it is generally at least 145° C., preferably at least 150° C., more preferably at least 160° C. Tg may be controlled to at least 165° C. when high heat resistance is required of the resulting norbornene polymer.

As needed, the norbornene polymers according to the present invention may be modified with an α,β-unsaturated carboxylic acid and/or a derivative thereof, styrenic hydrocarbon, organosilicon compound having an olefinically unsaturated bond and a hydrolyzable group, unsaturated epoxy monomer, or the like in accordance with a process publicly known by Japanese Patent Application Laid-Open No. 95235/1991 or the like. The modification is conducted before or after the hydrogenation.

Specific examples of the repeating unit represented by the formula (1) derived from the norbornene monomer include repeating units of forms that norbornene monomers such as 1,4-methano-1,4,4a,9a-tetrahydrofluorene and derivatives thereof, such as 1,4-methano-1,4,4a,9a-tetrahydrofluorene, 1,4-methano-8-methyl-1,4,4a,9a-tetrahydrofluorene, 1,4-methano-8-chloro-1,4,4a,9a-tetrahydrofluorene and 1,4-methano-8-bromo-1,4,4a,9a-tetrahydrofluorene; 1,4-methano-1,4,4a,4b,5,8,8a,9a-octahydro-9H-fluorene and derivatives thereof; 1,4-methano-1,4,4a,9a-tetrahydrobenzofuran and derivatives thereof; 1,4-methano-1,4,4a,9a-tetrahydrocarbazole and derivatives thereof, such as 1,4-methano-1,4,4a,9a-tetrahydrocarbazole and 1,4-methano-9-phenyl-1,4,4a,9a-tetrahydrocarbazole; 7,10-methano-6b,7,10,10a-tetrahydro fluoranthene and derivatives thereof; compounds obtained by further adding cyclopentadiene to 7,10-methano-6b,7,10,10a-tetrahydrofluoranthene; compounds obtained by adding cyclopentadiene to aceanthrylene; compounds obtained by adding cyclopentadiene to acephenanthrylene; 11,12-benzopentacyclo-[6.5.1.1$^{3,6}$.0$^{2,7}$.0$^{9,13}$]-4-pentadecene, 11,12-benzopentacyclo-[6.6.1.1$^{3,6}$.0$^{2,7}$.0$^{9,14}$]-4-hexadecene, and 14,15-benzoheptacyclo-[8.7.0.1$^{2,9}$.1$^{4,7}$.1$^{11,17}$.0$^{3,8}$.0$^{12,16}$]-5-eicosene are subjected to ring-opening polymerization or addition polymerization, and double bonds in the main chains of the resultant polymers and/or carbon-carbon unsaturated bonds in the rings thereof are hydrogenated to convert the rings into cyclohexane rings as they are.

Of these, norbornene polymers having a repeating unit in which the cyclic hydrocarbon structure (II) is a 5-membered ring, and the cyclic hydrocarbon structure (III) is a monocyclic 6-membered ring are preferred from the viewpoint of heat resistance and the like. More specifically, for example, 1,4-methano-1,4,4a,9a-tetrahydrofluorene or 1,4-methano-1,4,4a,4b,5,8,8a,9a-octahydro-9H-fluorene is preferred as a monomer.

The norbornene polymers according to the present invention may have repeating units derived from any other monomers copolymerizable with the norbornene monomer in addition to the repeating unit represented by the formula (1). Examples of the other copolymerizable monomers include other norbornene monomers such as tetracyclododecene, dicyclopentadiene, pentacyclopentadecene and pentacyclopentadecadiene; α-olefins such as ethylene, propylene and 1-butene; monocyclic cyclo-olefins such as cyclobutene, 1-methylcyclopentene, 3-methylcyclobutene, 3,4-diisopropenylcyclobutene, cyclopentene, 3-methylcyclopentene, cyclooctene, 1-methylcycyclooctene, 5-methylcyclooctene, cyclooctatetraene, 1,5-cyclooctadiene and cyclododecene; acetylene and substituted acetylene derivatives such as propyne and 1-butyne; dienes having double bonds at both terminals, such as 1,6-heptadiene. Of these, norbornene monomers are preferred by reason of provision of polymers excellent in heat resistance, with tetracyclododecene monomers having a norbornene ring which constitutes the main chain, and a norbornane ring which shares one carbon-carbon bond with the norbornene ring being particularly preferred.

Specific examples of repeating units derived from such tetracyclododecene monomers include repeating units derived from tetracyclo[4.4.0.1$^{2,5}$.1$^{7,10}$]-3-dodecene and its substituted compounds. More specifically, examples of repeating units include repeating units derived from monomers such as tetracyclo[4.4.0.1$^{2,5}$.1$^{7,10}$]-3-dodecene, 8-methyltetracyclo[4.4.0.1$^{2,5}$.1$^{7,10}$]-3-dodecene, 8-ethyltetracyclo[4.4.0.1$^{2,5}$.1$^{7,10}$]-3-dodecene, 8-propyltetracyclo[4.4.0.1$^{2,5}$.1$^{7,10}$]-3-dodecene, 8-butyltetracyclo-[4.4.0.1$^{2,5}$.1$^{7,10}$]-3-dodecene, 8-isobutyltetracyclo-[4.4.0.1$^{2,5}$.1$^{7,10}$]-3-dodecene, 8-hexyltetracyclo-[4.4.0.1$^{2,5}$.1$^{7,10}$]-3-dodecene, 8-cyclohexyltetracyclo-[4.4.0.1$^{2,5}$.1$^{7,10}$]-3-dodecene, 8-stearyltetracyclo-[4.4.0.1$^{2,5}$.1$^{7,10}$]-3-dodecene, 5,10-dimethyltetracyclo-[4.4.0.1$^{2,5}$.1$^{7,10}$]-3-dodecene, 2,10-dimethyltetracyclo-[4.4.0.1$^{2,5}$.1$^{7,10}$]-3-dodecene, 8,9-dimethyltetracyclo-[4.4.0.1$^{2,5}$.1$^{7,10}$]-3-dodecene, 8-ethyl-9-methyltetracyclo-[4.4.0.1$^{2,5}$.1$^{7,10}$]-3-dodecene, 11,12-dimethyltetracyclo-[4.4.0.1$^{2,5}$.1$^{7,10}$]-3-dodecene, 2,7,9-trimethyltetracyclo-[4.4.0.1$^{2,5}$.1$^{7,10}$]-3-dodecene, 9-ethyl-2,7-dimethyl-tetracyclo[4.4.0.1$^{2,5}$.1$^{7,10}$]-3-dodecene, 9-isobutyl-2,7-dimethyltetracyclo[4.4.0.1$^{2,5}$.1$^{7,10}$]-3-dodecene, 9,11,12-trimethyltetracyclo[4.4.0.1$^{2,5}$.1$^{7,10}$]-3-dodecene, 9-ethyl-11,12-dimethyltetracyclo[4.4.0.1$^{2,5}$.1$^{7,10}$]-3-dodecene, 9-isobutyl-11,12-dimethyltetracyclo[4.4.0.1$^{2,5}$.1$^{7,10}$]-3-dodecene, 5,8,9,10-tetramethyltetracyclo[4.4.0.1$^{2,5}$.1$^{7,10}$]-3-dodecene, 8-methylidenetetracyclo[4.4.0.1$^{2,5}$.1$^{7,10}$]-3-dodecene, 8-ethylidenetetracyclo[4.4.0.1$^{2,5}$.1$^{7,10}$]-3-dodecene, 8-ethylidene-9-methyltetracyclo[4.4.0.1$^{2,5}$.1$^{7,10}$]-3-dodecene, 8-ethylidene-9-ethyltetracyclo[4.4.0.1$^{2,5}$.1$^{7,10}$]-3-dodecene, 8-ethylidene-9-isopropyl tetracyclo-[4.4.0.1$^{2,5}$.1$^{7,10}$]-3-dodecene, 8-ethylidene-9-butyl-tetracyclo[4.4.0.1$^{2,5}$.1$^{7,10}$]-3-dodecene, 8-n-propylidene-tetracyclo[4.4.0.1$^{2,5}$.1$^{7,10}$]-3-dodecene, 8-n-propylidene-9-methyltetracyclo[4.4.0.1$^{2,5}$.1$^{7,10}$]-3-dodecene, 8-n-propylidene-9-ethyltetracyclo[4.4.0.1$^{2,5}$.1$^{7,10}$]-3-dodecene, 8-n-propylidene-9-isopropyltetracyclo[4.4.0.1$^{2,5}$.1$^{7,10}$]-3-dodecene, 8-n-propylidene-9-butyltetracyclo[4.4.0.1$^{2,5}$.1$^{7,10}$]-3-dodecene, 8-isopropylidenetetracyclo[4.4.0.1$^{2,5}$.1$^{7,10}$]-3-dodecene, 8-isopropylidene-9-methyltetracyclo-[4.4.0.1$^{2,5}$.1$^{7,10}$]-3-dodecene, 8-isopropylidene-9-ethyl-tetracyclo[4.4.0.1$^{2,5}$.1$^{7,10}$]-3-dodecene, 8-isopropylidene-9-isopropyltetracyclo[4.4.0.1$^{2,5}$.1$^{7,10}$]-3-dodecene, 8-iso-propylidene-9-butyltetracyclo[4.4.0.1$^{2,5}$.1$^{7,10}$]-3-dodecene, 8-chlorotetracyclo[4.4.0.1$^{2,5}$.1$^{7,10}$]-3-dodecene, 8-bromo-tetracyclo[4.4.0.1$^{2,5}$.1$^{7,10}$]-3-dodecene, 8-fluorotetracyclo-[4.4.0.1$^{2,5}$.1$^{7,10}$]-3-dodecene, 8,9-dichloro tetracyclo-[4.4.0.1$^{2,5}$.1$^{7,10}$]-3-dodecene and 8-methyl-8-carboxymethyl-tetracyclo[4.4.0.1$^{2,5}$.1$^{7,10}$]-3-dodecene. Tetracyclo-[4.4.0.1$^{2,5}$.1$^{7,10}$]-3-dodecene or 8-ethyltetracyclo-[4.4.0.1$^{2,5}$.1$^{7,10}$]-3-dodecene is generally used as a monomer from the viewpoints of mechanical strength properties and easy availability.

Further, the repeating units derived from these norbornene monomers may be those substituted by at least one polar group such as a halogen atom, hydroxyl group, ester group (for example, alkyl ester group), alkoxy group, cyano group, amide group, imide group or silyl group, in addition to the above-described compounds.

Production Process of Norbornene Polymer (1) Norbornene monomer:

The norbornene polymers according to the present invention can be produced by subjecting a monomer or monomer mixture comprising 20 to 100 mol % of a norbornene monomer (i) of a fused polycyclic structure having a norbornene ring structure (IA), a cyclic hydrocarbon structure (IIA), which shares one carbon-carbon bond with the norbornene ring structure (IA) and has 4 to 6 carbon atoms, and a monocyclic or polycyclic hydrocarbon structure (IIIA), which shares one carbon-carbon bond with the cyclic hydrocarbon structure (IIA) and has at least one carbon-carbon unsaturated bond in its ring, the compositional ratio (a:b) between an endo form (a) and an exo form (b) which are stereoisomers of said norbornene monomer being within a range of 70:30 to 100:0, and 0 to 80 mol % of any other monomer (ii) copolymerizable with the norbornene monomer to ring-opening (co)polymerization or addition (co) polymerization with a metathesis catalyst, and then hydrogenating the resultant polymer. The norbornene polymers according to the present invention are thermoplastic norbornene resins.

The norbornene monomer (i) having the above-described fused polycyclic structure is represented by the formula (2):

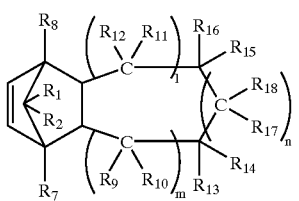

(2)

wherein the respective reference characters have the following meanings:

l and m are individually 0, 1 or 2;

n is 0, 1 or 2;

l+m+n≦2; and $R_1$, $R_2$ and $R_7$ to $R_{18}$ are independently a hydrogen atom, hydrocarbon group, halogen atom, hydroxyl group, ester group, alkoxy group, cyano group, amide group, imide group or silyl group, or a hydrocarbon group substituted by a polar group (a halogen atom, hydroxyl group, ester group, alkoxy group, cyano group, amide group, imide group or silyl group), with the proviso that:

$R_{14}$ and $R_{15}$ are bonded to each other to form a monocyclic or polycyclic hydrocarbon structure having at least one carbon-carbon unsaturated bond in its ring when n is 0;

any one or both of $R_{14}$ and $R_{17}$, and $R_{15}$ and $R_{18}$ are bonded to each other to form a monocyclic or polycyclic hydrocarbon structure having at least one carbon-carbon unsaturated bond in its ring when n is 1 or 2, provided that when both $R_{14}$ and $R_{17}$, and $R_{15}$ and $R_{18}$ are bonded to each other to form a cyclic hydrocarbon structure, the cyclic hydrocarbon structure may be a fused polycycle which shares at least one carbon-carbon bond with each other.

Examples of the halogen atom in the formula (2) include fluorine, chlorine, bromine and iodine atoms. Examples of the hydrocarbon group include alkyl groups having 1 to 20, preferably 1 to 10, more preferably 1 to 6 carbon atoms; alkenyl groups having 2 to 20, preferably 2 to 10, more preferably 2 to 6 carbon atoms; and cycloalkyl groups having 3 to 15, preferably 3 to 8, more preferably 5 or 6 carbon atoms. Examples of the hydrocarbon group substituted by a polar group include halogenated alkyl groups having 1 to 20, preferably 1 to 10, more preferably 1 to 6 carbon atoms.

When the norbornene monomer (i) represented by the formula (2) is subjected to addition polymerization, a repeating unit represented by the formula (3):

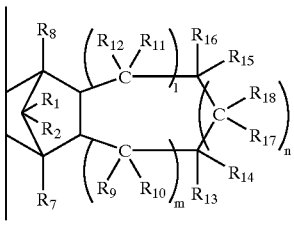

(3)

wherein the respective reference characters have the same meanings as defined in the formula (2), is obtained. When this repeating unit is hydrogenated, the repeating unit represented by the formula (1a) is formed.

When the norbornene monomer (i) represented by the formula (2) is subjected to addition polymerization, a repeating unit represented by the formula (4):

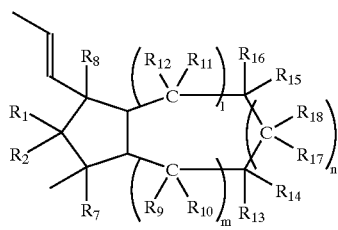

(4)

wherein the respective reference characters have the same meanings as defined in the formula (2), is obtained. When this repeating unit is hydrogenated, the repeating unit represented by the formula (1b) is substantially formed. When the carbon-carbon double bond in the main chain in the formula (4) is hydrogenated to saturate it, the hydrogenated product of the repeating unit of the formula (4) is the same as that represented by the formula (1b) because the carbon atom located at its terminal is bonded to a carbon atom located at a terminal of the next repeating unit.

In the formula (2), preferable embodiments are where l=0 and m=0, and more preferably where n=1. It is preferable that $R_{14}$ and $R_{17}$ form a benzene ring or cyclohexene ring structure, and other substituent groups are all hydrogen atoms.

Specific examples of the norbornene monomer (i) represented by the formula (2) include those described in, for example, Japanese Patent Application Laid-Open Nos. 97719/1993, 41550/1995 and 72210/1996. More specifically, the norbornene monomers mentioned in the specific examples of the repeating unit represented by the formula (1) derived from the norbornene monomer are mentioned.

Of these norbornene monomers (i), tetrahydrofluorenes such as 1,4-methano-1,4,4a,9a-tetrahydrofluorene represented by the formula (5):

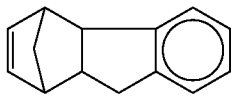
(5)

and the same substitution products thereof as described above, and octahydrofluorenes such as 1,4-methano-1,4,4a,4b,5,8,8a,9a-octahydro-9H-fluorene represented by the formula (6):

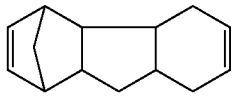
(6)

and the same substitution productes thereof as described above are generally used from the viewpoints of mechanical strength properties and easy availability.

For example, when 1,4-methano-1,4,4a,9a-tetrafluorene (THF) represented by the formula (6) is subjected to ring-opening polymerization, a repeating unit represented by the following formula (7):

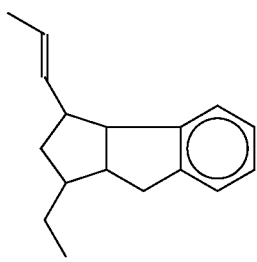
(7)

is formed. When the carbon-carbon double bond in the main chain and the benzene ring of the side chain in the repeating unit (7) are hydrogenated, a repeating unit represented by the formula (8):

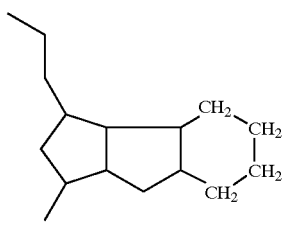
(8)

is obtained. This repeating unit represented by the formula (8) can be rewritten as a repeating unit represented by the formula (9):

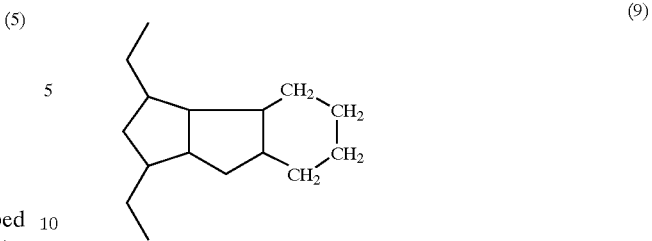
(9)

This unit corresponds to the repeating unit of the formula (1b).

Even when 1,4-methano-1,4,4a,4b,5,8,8a,9a-octahydro-9H-fluorene (MOF) represented by the formula (6) is subjected to ring-opening polymerization, and the resultant polymer is then hydrogenated, the repeating unit represented by the formula (8) or (9) can be obtained.

The cyclohexane ring in the formula (8) or (9) include 4 methylene groups, and 2 peaks derived from these methylene groups are observed in $^{13}$C-NMR measurement as described above.

Examples of the other monomer (ii) copolymerizable with the norbornene monomer (i) include various kinds of monomers mentioned in the specific examples of the repeating units derived from the other copolymerizable monomers described above. Of these, norbornene monomers such as tetracyclododecene, dicyclopentadiene and 3C (regular name) are preferred from the viewpoints of heat resistance, strength properties and the like. Of these, tetracyclododecenes such as tetracyclo[$4.4.0.1^{2,5}.1^{7,10}$]-3-dodecene represented by the formula (10):

(10)

and the same substitution productes (for example, 8-ethyl-tetracyclo[$4.4.0.1^{2,5}.1^{7,10}$]-3-dodecene) thereof as described above are most preferred. Substitution products thereof include alkyl, alkylidene or alkenyl-substituted derivatives, and derivatives of these substituted or unsubstituted compounds substituted by a polar group such as a halogen atom, hydroxyl group, ester group (for example, alkyl ester group), alkoxy group, cyano group, amide group, imide group or silyl group. When the other monomer (ii) have an unsaturated hydrocarbon group, the unsaturated hydrocarbon group is generally converted into a saturated hydrocarbon group upon the hydrogenation.

These norbornene monomers (i) and (ii) may be respectively used either singly or in any combination thereof.

Since the norbornene monomer (i) represented by the formula (2) has a norbornene ring (bridging ring), endo-exo isomers exist as stereoisomers. For example, in the case of 1,4-methano-1,4,4a,9a-tetrahydrofluorene (MTF), an endo form represented by the formula (11):

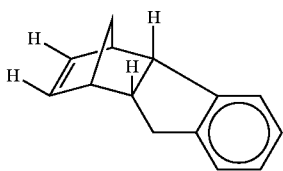

(11)

and an exo form represented by the formula (12):

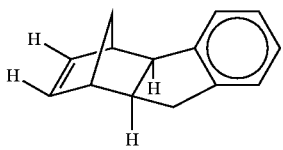

(12)

exist More specifically, the endo form and exo form exist according to the stereostructures of 2 tertiary carbon atoms bonded to the bridging structure of the norbornene ring and 2 tertiary carbon atoms at the joined sites of two 5-membered rings. Such stereoisomerism of the norbornene monomer substantially retains after polymerization and hydrogenation. For example, when 1,4-methano-1,4,4a,9a-tetrahydrofluorene is subjected to ring-opening polymerization, and the resultant polymer is then hydrogenated under moderate temperature conditions, the stereostructure of the resultant repeating unit is reflected by the stereostructure of MTF used though more or less isomerization occurs. This endo-exo isomerism has a certain correlation with the area ratio of methylene peaks caused by hydrogenating the aromatic ring in the $^{13}$C-NMR spectrum as described above.

More specifically, In order to provide a norbornene polymer excellent in heat resistance and little in distortion at high temperature, it is effective that a compositional ratio (a:b) between an endo form (a) and an exo form (b), which are stereoisomers of the norbornene monomer (i) falls within a range of 70:30 to 100:0, preferably 80:20 to 100:0 (mol %). If the proportion of the endo form of the norbornene monomer (1) is extremely low, the heat resistance of the resulting polymer is impaired. It is hence not preferable to use such a monomer.

(2) Polymerization catalyst and polymerization process:

Production processes of the norbornene polymers according to the present invention include an addition polymerization process and a ring-opening polymerization process. When a polymer is produced in accordance with, for example, a ring-opening polymerization process using a living metathesis polymerization catalyst, no particular limitation is imposed on the metathesis polymerization catalyst used, and any publicly known catalyst may be used. More specifically, there may be used a catalyst system composed of a halide, nitrate or acetylacetone compound of a metal selected from ruthenium, rhodium, palladium, osmium, iridium, platinum or the like, and a reducing agent; a catalyst system composed of a halide or acetylacetone compound of a metal selected from titanium, vanadium, zirconium, tungsten or molybdenum, and an organoaluminum compound as a promoter; or the publicly known living ring-opening metathesis catalyst of the Shuloc type or Glabus type disclosed in Japanese Patent Application Laid-Open No. 179575/1995; J. Am. Chem. Soc., 1986, 108, 733; J. Am. Chem. Soc., 1993, 115, 9858; or J. Am. Chem. Soc., 1996, 118, 100.

These catalyst may be used either singly or in any combination thereof. The amount of the catalyst used may be suitably selected according to polymerization conditions and the like. However, it is generally 1/1,000,000 to 1/10, preferably 1/100,000 to 1/100 in terms of its molar ratio to the total amount of the norbornene monomer(s).

In the present invention, a polar compound can be further added to the catalyst system to enhance polymerization activity and selectivity of ring-opening polymerization. Examples of the polar compound include molecular oxygen, alcohols, ethers, peroxides, carboxylic acids, acid anhydrides, acid chlorides, esters, ketones, nitrogen-containing compounds, sulfur-containing compounds, halogen-containing compounds, molecular iodine, and other Lewis acids. As the nitrogen-containing compound is preferred an aliphatic or aromatic tertiary amine. Specific examples thereof include triethylamine, dimethylaniline, tri-n-butylamine, pyridine and α-picoline. These polar compounds may be used either singly or in any combination thereof. The amount used is suitably selected. However, it is within a range of generally 1 to 100,000, preferably 5 to 10,000 in terms of a ratio to the metal(s) in the catalyst, i.e., a ratio (molar ratio) of the polar compound to the metal.

The polymerization reaction may be conducted either by bulk polymerization without using any solvent or in a solvent such as an organic solvent. No particular limitation is imposed on the solvent so far as it is inert to the polymerization reaction. However, examples thereof include aromatic hydrocarbons such as benzene, toluene and xylene; aliphatic hydrocarbons such as n-pentane, hexane and heptane; alicyclic hydrocarbons such as cyclohexane; halogenated hydrocarbons such as styrene dichloride, dichloroethane, dichloroethylene, tetrachloroethane, chlorobenzene, dichlorobenzene and trichlorobenzene; and nitrogen-containing hydrocarbons such as nitromethane, nitrobenzene, acetonitrile and benzonitrile.

The polymerization temperature is generally within a range of –50° C. to 200° C., preferably –30° C. to 180° C., more preferably –20° C. to 150° C., and the polymerization pressure is generally within a range of 0 to 50 kgf/cm$^2$, preferably 0 to 20 kgf/cm$^2$. The polymerization time is suitably selected according to polymerization conditions, but is generally within a range of 30 minutes to 20 hours, preferably 1 to 10 hours.

(3) Hydrogenation catalyst and hydrogenation reaction:

In the present invention, the hydrogenation reaction of the norbornene polymer is generally carried out at 200° C. or lower, preferably 195° C. or lower, most preferably 190° C. or lower. The hydrogenation temperature is preferably within a range of 100 to 200° C., more preferably within a range of 130 to 195° C. If the hydrogenation reaction is carried out at a temperature exceeding 200° C., an isomerization reaction tends to occur in the respective repeating units of the polymer, so that the heat resistance of the resulting norbornene polymer is deteriorated with time as the hydrogenation reaction is allowed to progress. Therefore, the hydrogenation reaction conditions have been investigated to inhibit the isomerization reaction. As a result, it has been found that the highest temperature reached in the hydrogenation reaction is controlled within the range of 200° C. or lower as described above, whereby a hydrogenated product excellent in high temperature properties can be stably produced.

As the hydrogenation catalyst, there may be used a catalyst described in Japanese Patent Application Laid-Open No. 43412/1983, 26024/1985, 24826/1989, 138257/1989 or 41550/1995, or the like, and it may be either a homogeneous catalyst or a heterogeneous catalyst. The homogeneous catalyst is easy to be dispersed in a hydrogenation reaction solution, so that it may be added in a small amount. In addition, since it has high activity, hydrogenation can be conducted in a short period of time in a small catalytic amount. The heterogeneous catalyst is excellent in production efficiency in that it becomes highly active under conditions of high temperature and high pressure, hydrogenation can be conducted in a short period of time, and its removal is easy. Examples of the homogeneous catalyst include a Wilkinson's complex, i.e., chlorotris (triphenylphosphine)-rhodium (I); catalysts composed of a combination of a transition metal compound and an alkyl metal compound, for examples, combinations of cobalt acetate/triethylaluminum, nickel acetylacetonate/triisobutylaluminum, titanocene dichloride/n-butyllithium, zirconocene dichloride/sec-butyllithium, tetrabutoxytitanate/dimethylmagnesium, etc.

Examples of the heterogeneous catalyst include catalysts with a metallic hydrogenation catalyst such as Ni or Pd carried on a support. Ni is preferably used as the metal carried from the viewpoints of activity, hydrogenation efficiency and isomerization rate. When a Pd catalyst is used, the progress of isomerization is accelerated, so that the softening point of the resulting polymer is lowered. When preference is given to mixing of impurities and the like as little as possible, it is preferred that an adsorbent such as alumina or diatomaceous earth be used as the support.

The hydrogenation reaction is generally carried out in an organic solvent. No particular limitation is imposed on the solvent so far as it is inert to the catalyst used. However, a hydrocarbon solvent is generally used because it has the excellent ability to dissolve a hydrogenated product formed therein.

Examples of such a hydrocarbon solvent include aromatic hydrocarbons such as benzene and toluene; aliphatic hydrocarbons such as n-pentane and hexane; and alicyclic hydrocarbons such as cyclohexane and decalin. Of these, the cyclic solvents such as the aromatic hydrocarbons and alicyclic hydrocarbons are preferred. These organic solvent may be used either singly or in any combination.

The hydrogenation reaction can be performed in accordance with a method known per se in the art. However, hydrogenation rate varies according to the kind of the hydrogenation catalyst and reaction temperature. Hydrogen pressure is generally controlled to 0.1 to 100 kgf/cm$^2$, preferably 0.5 to 60 kgf/cm$^2$, more preferably 1 to 50 kgf/cm$^2$.

The removal of the catalyst after completion of the hydrogenation reaction may be conducted in accordance with a method known per se in the art, such as centrifugation and/or filtration. As needed, a catalyst inactivator such as water or alcohol may be utilized, or an adsorbent such as activated clay or alumina may be added. In application fields of medical equipments and the like, in which dissolving-out of a residual transition metal is not preferable, it is preferred that substantially no transition metal remains. In order to obtain such a hydrogenated product of the polymer, it is preferable to use an adsorbent such as alumina having specific pore volume and specific surface area such as disclosed in Japanese Patent Application Laid-Open No. 317411/1993 or the like or to wash a solution of the resultant hydrogen product with acid water and purified water. No particular limitation is imposed on a centrifuging method and a filtering method so far as they are conducted under conditions that the catalyst used can be removed. The removal by filtration is preferred because it is simple and effective. When conducting filtration, it may be either filtration under pressure or suction filtration. It is preferable to use a filter aid such as diatomaceous earth or pearlite from the viewpoint of efficiency.

Molding Material

The molding materials according to the present invention is composed of the above-described norbornene polymer alone, or a resin composition comprising the norbornene polymer, and other polymeric materials and various kinds of additives incorporated according to various application fields as desired.

(1) Other polymeric material:

Examples of other polymeric materials include rubbery polymers and other thermoplastic resins.

Rubbery Polymer

The rubbery polymers are polymers having a glass transition temperature (Tg) of 40° C. or lower and include general rubber-like polymers and thermoplastic elastomers. The Mooney viscosity ($ML_{1+4}$, 100° C.) of such a rubbery polymer is suitably selected as necessary for the end application intended and is generally 5 to 300.

Examples of the rubber-like polymers include ethylene-α-olefin type rubbery polymers; ethylene-α-olefin-polyene terpolymer rubber; copolymers of ethylene and an unsaturated carboxylic acid ester, such as ethylene-methyl methacrylate and ethylene-butyl acrylate; copolymers of ethylene and a fatty acid vinyl ester, such as, ethylene-vinyl acetate; polymers of acrylic acid alkyl esters such as ethyl acrylate, butyl acrylate, hexyl acrylate, 2-ethylhexyl acrylate and lauryl acrylate; diene rubbers such as polybutadiene, polyisoprene, styrene-butadiene or styrene-isoprene random copolymers, acrylonitrile-butadiene copolymers, butadiene-isoprene copolymers, butadiene-alkyl (meth)acrylate copolymers, butadiene-alkyl (meth)acrylate-acrylonitrile terpolymers and butadiene-alkyl (meth)acrylate-acrylonitrile-styrene tetrapolymer; and butylene-isoprene copolymers.

Examples of the thermoplastic elastomers include aromatic vinyl-conjugated diene block copolymers such as styrene-butadiene block polymers, hydrogenated styrene-butadiene block co polymers, hydrogenated styrene-isoprene block copolymers and hydrogenated styrene-isoprene block copolymers; low crystalline polybutadiene resins; ethylene-propylene elastomers; styrene-grafted ethylene-propylene elastomers, thermoplastic polyester elastomers, and ethylenic ionomer resins.

Of these thermoplastic elastomers, the hydrogenated styrene-butadiene block copolymers and hydrogenated styrene-isoprene block copolymers are preferred. As specific examples thereof, may be mentioned those described in Japanese Patent Application Laid-Open Nos. 133406/1990, 305814/1990, 72512/1991, 74409/1991, etc.

These rubbery polymers may be used either singly or in any combination thereof. The compounding proportion of the rubbery polymer is suitably selected according to the purpose of use.

When the molding material according to the present invention is used at a high temperature of 100° C. or higher, it is required to retain the transparency of the molding material comprising the norbornene polymer over a long period of time. In this case, the transparency can be retained over a long period of time by compounding the rubbery polymer. The compounding proportion of the rubbery polymer in that case is within a range of generally 0.0001 to 10 parts by weight, preferably 0.001 to 5 parts by weight, more preferably 0.01 to 3 parts by weight per 100 parts by weight of the norbornene polymer.

When high impact resistance and flexibility, or high film strength when the molding material is used as a film is required, the compounding proportion of the rubbery polymer is within a range of generally 0.01 to 100 parts by weight, preferably 0.1 to 70 parts by weight, more preferably 1 to 50 parts by weight per 100 parts by weight of the norbornene polymer.

Other Thermoplastic Resins

Examples of the other thermoplastic resins include low density polyethylene, high density polyethylene, linear low density polyethylene, very low density polyethylene, ethylene-ethyl acrylate copolymers, ethylene-vinyl acetate copolymers, polystyrene, poly(phenylene sulfide), poly(phenylene ether), polyamide, polyester, polycarbonate, cellulose triacetate and other norbornene polymers than the norbornene polymers according to the present invention.

A different kind of a thermoplastic resin such as polycarbonate, polystyrene, poly(phenylene sulfide), poly(ether imide), polyester, polyamide, polyarylate, polysulfone or poly(ether sulfone) may also be compounded for the purpose of controlling mechanical properties and the like.

These other thermoplastic resins may be used either singly or in any combination thereof. The compounding amount thereof is suitably selected within limits not impeding the objects of the present invention.

As additives compounded into the molding materials according to the present invention as needed, any additives may be used without any particular limitation so far as they are those generally used in fields of uses applied.

(2) Additives:

Examples of the additives include stabilizers, lubricants, ultraviolet absorbents, antistatic agents, slip agents, antifogging agents, dyes, pigments, natural oil, synthetic oil, wax, flame retardants, flame retardant auxiliaries, compatibilizers, crosslinking agents, crosslinking aids, plasticizers and organic or inorganic fillers.

Stabilizer

Examples of the stabilizer include fatty acid metal salts such as zinc stearate, calcium stearate and calcium 1,2-hydroxystearate; fatty acid esters of polyhydric alcohols, such as glycerol monostearate, glycerol distearate, pentaerythritol distearate and pentaerythritol tristearate; phenolic antioxidants, phosphoric antioxidants and sulfuric antioxidants. Of these, the phenolic antioxidants are preferred, with alkyl substituted phenolic antioxidants being particularly preferred.

As the phenolic antioxidants, may be used conventionally known antioxidants, and examples thereof include acrylate compounds described in Japanese Patent Application Laid-Open Nos. 179953/1988 and 168643/1989, such as 2-t-butyl-6-(3-t-butyl-2-hydroxy-5-methylbenzyl)-4-methylphenyl acrylate, 2,4-di-t-amyl-6-(1-(3,5-di-t-amyl-2-hydroxyphenyl)ethyl)phenyl acrylate; alkyl substituted phenolic compounds such as 2,6-di-t-butyl-4-methylphenol, 2,6-di-t-butyl-4-ethylphenol, octadecyl-3-(3,5-di-t-butyl-4-hydroxyphenyl) propionate, 2,2'-methylene-bis(4-methyl-6-t-butylphenol), 4,4'-butylidene-bis(6-t-butyl-m-cresol, 4,4'-thiobis(3-methyl-6-t-butyl-phenol), bis(3-cyclohexyl-2-hydroxy-5-methylphenyl)-methane, 3,9-bis[2-[3-(3-t-butyl-4-hydroxy-5-methyl-phenyl)propionyloxy]-1,1-dimethylethyl]-2,4,8,10-tetraoxaspiro[5,5]undecane, 1,1,3-tris(2-methyl-4-hydroxy-5-t-butylphenyl)butane, 1,3,5-trimethyl-2,4,6-tris(3,5-di-t-butyl-4-hydroxybenzyl) benzene, tetrakis[methylene-3(3',5'-di-t-butyl-4'-hydroxyphenyl)propionate]methane [i.e., pentaerythrityl-tetrakis[3-(3,5-di-t-butyl-4-hydroxyphenyl) propionate]], triethylene glycol bis(3-(3-t-butyl-4-hydroxy-5-methylphenyl) propionate) and tocopherol; and triazine group-containing phenolic compounds such as 6-(4-hydroxy-3,5-di-t-butylanilino)-2,4-bis-octylthio-1,3,5-triazine, 6-(4-hydroxy-3,5-dimethylanilino)-2,4-bis-octylthio-1,3,5-triazine, 6-(4-hydroxy-3-methyl-5-t-butylanilino)-2,4-bis-octylthio-1,3,5-triazine and 2-octylthio-4,6-bis-(3,5-di-t-butyl-4-oxyanilino)-1,3,5-triazine.

No particular limitation is imposed on the phosphoric antioxidants so far as they are those commonly used in general resin industries, and examples thereof include monophosphite compounds such as triphenyl phosphite, diphenylisodecyl phosphite, phenyldiisodecyl phosphite, tris(nonylphenyl) phosphite, tris(dinonylphenyl) phosphite, tris(2,4-di-t-butylphenyl) phosphite, tris(2-t-butyl-4-methylphenyl) phosphite, tris(cyclohexylphenyl) phosphite, 2,2-methylenebis(4,6-di-t-butylphenyl)octyl phosphite, 9,10-dihydro-9-oxa-10-phosphaphenanthrene-10-oxide, 10-(3,5-di-t-butyl-4-hydroxybenzyl)-9,10-dihydro-9-oxa-10-phosphaphenanthrene-10-oxide and 10-decyloxy-9,10-dihydro-9-oxa-10-phosphaphenanthrene; and diphosphite compounds such as 4,4'-butylidene-bis(3-methyl-6-t-butylphenyl-di-tridecyl phosphite), 4,4'-isopropylidene-bis [phenyl-di-alkyl($C_{12}$–$C_{15}$) phosphite], 4,4'-isopropylidene-bis[diphenylmonoalkyl($C_{12}$–$C_{15}$) phosphate], 1,1,3-tris(2-methyl-4-di-tridecylphosphite-5-t-butylphenyl)butane, tetrakis(2,4-di-t-butylphenyl)-4,4'-biphenylene diphosphite, cyclic neopentanetetrayl bis(octadecyl phsphite), cyclic neopentanetetrayl bis(isodecyl phsphite), cyclic neopentanetetrayl bis(nonylphenyl phsphite), cyclic neopentanetetrayl bis(2,4-di-t-butylphenyl phsphite), cyclic neopentanetetrayl bis(2,4-dimethylphenyl phsphite) and cyclic neopentanetetrayl bis(2,6-di-t-butylphenyl phsphite).

Of these, the monophosphite compounds are preferred, with tris(nonylphenyl) phosphite, tris(dinonylphenyl) phosphite and tris(2,4-di-t-butylphenyl) phosphate being particularly preferred.

Examples of the sulfuric antioxidants include dilauryl 3,3'-thiodipropionate, dimyristyl 3,3'-thiodipropionate, distearyl 3,3'-thiodipropionate, laurylstearyl 3,3'-thiodipropionate, pentaerythritol tetrakis(β-lauryl thiopropionate) and 3,9-bis(2-dodecylthioethyl)-2,4,8,10-tetraoxaspiro[5,5]undecane.

These antioxidants may be used either singly or in any combination thereof. The amount of the antioxidant to be compounded is generally within a range of from 0.001 to 5 parts by weight, preferably from 0.01 to 1 part by weight per 100 parts by weight of the norbornene polymer.

Lubricant

As the lubricant, may be used an organic compound such as an ester of an aliphatic alcohol, or an ester or partial ester of a polyhydric alcohol, or inorganic fine particles. Examples of the organic compound include glycerol monostearate, glycerol monolaurate, glycerol distearate, pent aerythritol monostearate, pentaerythritol distearate and pentaerythritol tristearate.

Inorganic Fine Particles

The inorganic fine particles indicate oxides, hydroxides, sulfides, nitrides, halides, carbonates, sulfates, acetates, phosphates, phosphates, organic 10 carboxylates, silicates, titanates, borates of elements of Groups IA, IIA, IVA, VI, VIIA, VIII, IB, IIB, IIIB and IVB, and hydrous compounds thereof, complex compounds with them as the central figure, and natural mineral particles.

More specifically, examples thereof include compounds of Group IA elements, such as lithium fluoride and borax (sodium borate); compounds of Group IIA elements, such as magnesium carbonate, magnesium phosphate, magnesium oxide (magnesia), magnesium chloride, magnesium acetate, magnesium fluoride, magnesium titanate, magnesium silicate, magnesium silicate hydrate salt (talc), calcium carbonate, calcium phosphate, calcium phosphite, calcium sulfate (gypsum), calcium acetate, calcium terephthalate, calcium hydroxide, calcium silicate, calcium fluoride, calcium titanate, strontium titanate, barium carbonate, barium phosphate, barium sulfate and barium phosphate; compounds of Group IVA elements, such as titanium dioxide (titania), titanium monoxide, titanium nitride, zirconium dioxide (zirconia) and zirconium monoxide; compounds of Group VIA elements, such as molybdenum dioxide, molybdenum trioxide and molybdenum sulfide; compounds of Group VIIA elements, such as manganese chloride and manganese acetate; compounds of Group VIII elements, such as cobalt chloride and cobalt acetate; compounds of Group IB elements, such as copper(I) iodide; compounds of Group IIB elements, such as zinc oxide and zinc acetate; compounds of Group IIIB elements, such as aluminum oxide (alumina), aluminum hydroxide, aluminum fluoride, aluminosilicate (alumina silicate, kaolin, kaolinite); compounds of Group IVB elements, such as silicon oxide (silica, silica gel), graphite, carbon, graphite and glass; and natural minerals such as carnallite, mica (mica, phlogopite) and pyrosmalite.

No particular limitation is imposed on the average particle diameter of the inorganic fine particles, but it is generally 0.01 to 3 μm.

These lubricants and inorganic fine particles may be respectively used either singly or in any combination thereof. The compounding proportion of the lubricant is suitably selected according to the purpose of use. When the molding material according to the present invention is formed into a film, the compounding proportion of the lubricant is generally 0.001 to 5 parts by weight, preferably 0.005 to 3 parts by weight per 100 parts by weight of the norbornene polymer.

Ultraviolet Absorbent

Examples of the ultraviolet absorbents include hindered amine type ultraviolet absorbents such as 2,2,6,6-tetramethyl-4-piperidyl benzoate, bis(2,2,6,6-tetramethyl-4-piperidyl) sebacate, bis(1,2,2,6,6-pentamethyl-4-piperidyl)-2-(3,5-di-t-butyl-4-hydroxybenzyl)-2-n-butylmalonate and 4-(3-(3,5-di-t-butyl-4-hydroxyphenyl)-propionyloxy)-1-(2-(3-(3,5-di-t-butyl-4-hydroxyphenyl)-propionyloxy)ethyl)-2,2,6,6-tetramethylpiperidine; benzotriazole type ultraviolet absorbents such as 2-(2-hydroxy-5-methylphenyl) benzotriazole, 2-(3-t-butyl-2-hydroxy-5-methylphenyl)-5-chlorobenzotriazole, 2-(3,5-di-t-butyl-2-hydroxyphenyl)-5-chlorobenzotriazole and 2-(3,5-di-t-amyl-2-hydroxyphenyl) benzotriazole; and benzoate type ultraviolet absorbents such as 2,4-di-t-butylphenyl-3,5-di-t-butyl-4-hydroxybenzoate and hexadecyl-3,5-di-t-butyl-4-hydroxybenzoate.

These ultraviolet absorbents may be used either singly or in any combination thereof. The compounding amount of the ultraviolet absorbent is within a range of generally 0.001 to 5 parts by weight, preferably 0.01 to 1 part by weight per 100 parts by weight of the norbornene polymer.

Antistatic Agent

As examples of the antistatic agents, may be mentioned long-chain alkyl alcohols such as stearyl alcohol and behenyl alcohol; sodium alkylsulfonates and/or alkylsulfonic acid phosphonium salts; fatty acid esters such as stearic acid glycerol esters; hydroxyamine compounds; fillers such as amorphous carbon, tin oxide powder and antimony-containing tin oxide powder.

When a colorant and an antistatic agent are added, proportions thereof are generally within a range of 0 to 5 parts by weight for the colorant and a range of 0 to 5 parts by weight for the antistatic agent, per 100 parts by weight of the norbornene polymer.

Filler

The fillers include organic and inorganic fillers. The filler may have any desired form such as powder, particles, flake of fiber. More specifically, as examples of the fillers, may be mentioned silica, diatomaceous earth, alumina, titanium oxide, magnesium oxide, pumice powder, pumice balloon, basic magnesium carbonate, dolomite, calcium oxide, calcium carbonate, calcium sulfate, potassium titanate, barium sulfate, calcium sulfite, talc, clay, mica, asbestos, glass fibers, glass flake, glass beads, calcium silicate, montmorillonite, bentonite, graphite, aluminum powder, molybdenum sulfide, boron fibers, silicon carbide fibers, polyethylene fibers, polypropylene fibers, polyester fibers and polyamide fibers.

These fillers may be added either singly or in any combination thereof. The compounding proportion of the filler may be suitably determined according to their own functions and the purpose of use within limits not impeding the objects of the present invention.

Other Compounding Additives

Examples of other compounding additives include pigments, dyes, anti-blocking agents, natural oil, synthetic oil and flame retardants. These compounding additives may be used either singly or in any combination thereof. The compounding proportion thereof are selected according to the intended molded or formed product within limits not impeding the objects of the present invention.

No particular limitation is imposed on the method of adding these other polymeric materials and various compounding additives so far as it is a method capable of sufficiently dispersing these compounding components in the norbornene polymer. For example, they are added in any course during polymerization or in any course of melt extrusion.

When a rubbery polymer is used as a compounding additive, there may be used a method of kneading the rubbery polymer at a resin temperature in a molten state by means of a ribbon blender, Henschel mixer or twin-screw kneader or the like, or a method of dissolving the rubbery polymer in a proper solvent to disperse and mix it and then removing the solvent by a solidifying process, casting process or direct drying process.

Molded or Formed Product

The molded or formed products according to the present invention can be produced by forming the molding material into a sheet, film or the like by well-known molding or forming methods.

Examples of the molding or forming method include injection molding, extrusion blow molding, injection blow molding, two-stage blow molding, multi-layer blow molding, connection blow molding, stretch blow molding, rotational molding, vacuum forming, extrusion, calendering, solution casting, hot pressing and inflation methods. However, the present invention is not limited to the specific molding or forming methods so far as the molding material may be molded or formed. As described in Japanese Patent Application Laid-Open No. 276253/1992, a multi-layer molding or double-wall molding with another resin may be conducted to further enhance gas barrier properties, weathering properties and light resistance.

Uses

The molded or formed products according to the present invention are excellent in heat resistance, extremely small in distortion at high temperature and moreover excellent in transparency, low birefringence, moisture resistance, impact resistance, mechanical strength, solution stability, low water absorption property and chemical resistance, and are hence useful in wide variety of fields as various molded or formed articles. For example, they can be applied to various uses such as medical equipments; electrical insulating materials; electronic part treating equipments; optical materials; transparent electronic parts uses for photo detectors; structural materials or building materials such as windows, machine parts and housings; automotive equipments such as bumpers, room mirrors, head lamp covers, tail lamp covers and instrument panels; electric equipments such as speaker cone materials, oscillators for speakers and electronic oven containers; food containers such as bottles, returnable bottles and nursing bottles; packaging materials such as wraps; and films, sheets and helmets.

Medical Equipment

Examples of the medical equipments include containers for liquid, powdery and solid medicines, such as bottles, bottle caps, vials, ampoules, prefilled syringes, bags for transfusion, tightly sealed medicine bags, press-through packages and ophthalmic solution containers; sampling containers such as sampling test tubes for blood inspection, blood collecting tubes, inspection cells and specimen containers; medical instruments such as syringes and rods for syringes; sterilizing containers for medical tools such as knives, farceps, gauze, contact lenses; experimental and analytic tools such as beakers, Petri dishes, flasks, test tubes and centrifugal tubes; medical optical parts such as plastic lenses for medical inspection; piping materials such as medical transfusion tubes, catheters, piping, couplings, valves and filters; and prostheses and parts therefor, such as denture bases, dental prostheses, artificial hearts, artificial teeth roots, artificial bones and artificial joints.

In medicine containers, prefilled syringes and syringes in particular, the properties that they are excellent in heat resistance, free of distortion and opaque whitening at high temperature, particularly, upon repeated sterilization at high temperature, and excellent in impact resistance, mechanical strength and steam sterilization resistance in addition to excellent transparency, heat resistance and chemical resistance compared with those made of the conventional resins are put to practical use.

The medical equipments making use of the molding material according to the present invention can be sufficiently used even when the norbornene polymer according to the present invention is used by itself. As needed, other polymeric materials and various additives may be compounded therein.

For example, it is preferable to compound a thermoplastic elastomer into the norbornene polymer in order to further enhance the impact resistance without lowering the heat resistance. In particular, a hydrogenated styrene-butadiene block copolymer, hydrogenated styrene-isoprene block copolymers, hydrogenated styrene-butadiene random copolymer, ethylene-propylene elastomer or the like is compounded in a proper amount, whereby the impact resistance can be enhanced while retaining the heat resistance.

The thermoplastic elastomers may be used either singly or in any combination thereof. When the elastomer is compounded in a proportion of generally 0.0001 to 30 parts by weight, preferably 0.001 to 10 parts by weight, more preferably 0.01 to 5 parts by weight per 100 parts by weight of the norbornene polymer according to the present invention, the intended properties can be attained. When the compounding amount of the thermoplastic elastomer falls within the above range, the transparency of the molding material can be retained without lowering the heat resistance, and characteristics such as purity as a medical use are moderately balanced. It is hence preferred to compound the thermoplastic elastomer in the above range.

In order to further enhance durability without lowering the heat resistance, it is preferable to compound an antioxidant. In particular, the above-described phenolic antioxidants are preferred because resistance to dissolving-out from the molding material is excellent. The antioxidants may be used either singly or in any combination thereof. When the antioxidant is compounded in a proportion of generally 0.001 to 10 parts by weight, preferably 0.001 to 5 parts by weight, more preferably 0.01 to 3 parts by weight per 100 parts by weight of the norbornene polymer according to the present invention, the intended properties can be attained.

In order to further enhance moldability upon processing without lowering the heat resistance, it is preferable to compound the above-described lubricants. The lubricants may be used either singly or in any combination thereof. When the lubricant is compounded in a proportion of generally 0.0001 to 10 parts by weight, preferably 0.001 to 5 parts by weight, more preferably 0.01 to 3 parts by weight per 100 parts by weight of the norbornene polymer according to the present invention, the moldability can be improved.

Electrical Insulating Member

The molded or formed products according to the present invention are excellent in heat resistance, small in distortion at high temperature and moreover excellent in electrical properties such as low dielectric constant and low dielectric loss tangent, and further low in temperature dependence of these electrical properties at high temperature, and are hence useful in wide variety of fields as electrical insulating members.

The molded or formed products according to the present invention can be used in, for example, general insulating materials such as wire and cable covering materials, and insulating materials for OA equipments and instruments such as public or industrial electronic equipments, copying machines, computers, printers, televisions, video decks, etc.; film capacitors for communication, electronic equipments, electric equipments, electric power, and medium or low pressure phase advancers; circuit boards such as hard printed boards, flexible printed boards and multi-layer printed interconnection boards, particularly, high-frequency circuit boards for satellite communication equipments of which high-frequency properties are required; bases of transparent conductive films for face heaters for liquid crystal substrates, photo memories, defrosters for automobiles and aircraft's, etc.; sealing materials for electric and electronic parts such as motors, connectors, switches and sensors; and structural members for parabola antennas, flat antennas and radar domes.

Electronic Part Treating Equipment

The molded or formed products according to the present invention do substantially not contain impurities dissolved out of the molding material, and have resistance to most of chemicals used for treatment of electronic parts, in particular, almost all strong acids other than sulfuric acid. Accordingly, the molded or formed products according to the present invention have various preferable properties as electronic part treating equipments which undergo no distortion even when coming into contact with a high-temperature part.

The electronic part treating equipment means (1) equipment coming into contact with electronic parts such as semiconductors such as IC and LSL, and hybrid IC, liquid crystal display devices, and light emitting diodes; (2) equipment coming into contact with intermediates for production, such as wafers, liquid crystal substrates, and those having a transparent electrode layer and a protective layer laminated thereon, and (3) equipment coming into contact with treating liquids such as a chemical used in the treatment of the intermediates for production and ultrapure water in a production process of electronic parts.

Examples of (1) the equipment coming into contact with electronic parts and (2) the equipment coming into contact with intermediates for production of electronic parts include containers for treatment and transfer, such as tanks, trays, carriers, shipper and cases; and protective materials such as carrier tapes and separation films. Example of (3) the equipment coming into contact with treating liquids include piping such as pipes, tubes, valves, flowmeters, filters and pumps; and containers for liquids such as sampling containers, bottles, ampoules and bags.

The electrical insulating members and electronic part treating equipments making use of the molding material according to the present invention can be sufficiently used even when the norbornene polymer according to the present invention is used by itself. As needed, other polymeric materials and various additives may be compounded therein.

For example, it is preferable to compound a thermoplastic elastomer into the norbornene polymer in order to enhance the impact resistance, and further improve the film strength and flexibility without lowering the heat resistance when it is used as a film in particular. More specifically, a hydrogenated styrene-butadiene block copolymer, hydrogenated styrene-isoprene block copolymers, hydrogenated styrene-butadiene random copolymer, ethylene-propylene elastomer or the like is used as the thermoplastic elastomer, whereby the impact resistance, film strength and flexibility can be enhanced while retaining the heat resistance. These thermoplastic elastomers may be used either singly or in any combination thereof. When the elastomer is compounded in a proportion of generally 0.01 to 100 parts by weight, preferably 0.01 to 70 parts by weight, more preferably 1 to 50 parts by weight per 100 parts by weight of the norbornene polymer according to the present invention, the intended properties can be attained.

In order to further enhance durability without lowering the heat resistance, it is preferable to compound an antioxidant. In particular, the above-described phenolic antioxidants are preferred because the deterioration of the electrical properties of the molded or formed product containing such an antioxidant is extremely slight. The antioxidants may be used either singly or in any combination thereof. When the antioxidant is compounded in a proportion of generally 0.001 to 10 parts by weight, preferably 0.001 to 5 parts by weight, more preferably 0.01 to 3 parts by weight per 100 parts by weight of the norbornene polymer according to the present invention, the intended properties can be attained.

In order to further enhance moldability upon processing without lowering the heat resistance, it is preferable to compound the above-described lubricants. The lubricants may be used either singly or in any combination thereof. When the lubricant is compounded in a proportion of generally 0.0001 to 10 parts by weight, preferably 0.001 to 5 parts by weight, more preferably 0.01 to 3 parts by weight per 100 parts by weight of the norbornene polymer according to the present invention, the moldability can be improved.

When it is used as a film, an anti-blocking agent may be compounded in a necessary amount if necessary. When used as an application field such as a sealing material or insulating base or substrate of which flame retardant is required, a necessary amount of a flame retardant can be compounded. When the strength of the material is required, an inorganic filler such as glass fibers may be compounded in a necessary amount, or a hardening agent may be compounded to cure the polymer.

Optical Member

Example of uses as optical members of the molded or formed products according to the present invention include molded lenses (camera lenses, video camera lenses, finder lenses, pickup lenses for optical disks, fθ lenses for laser printers, spectacle lenses, plastic lenses for medical inspection, collimating lenses, projection lenses for projection televisions, projection lenses for OHP, wave guide type lenses such as geodesic lenses, Fresnel lenses, lenticular lenses and grating lenses, etc.), optical disks, optical fibers, optical cards, optical mirrors, sensor covers, substrates for liquid crystal display devices, light guide plates, light diffusing plates, deflecting films, phase difference films, waveguides, other waveguide type circuit devices and parts, light diffusing sheets, prisms, prism sheets, grating, optical memory bases, automotive members (window materials, roof materials, mirrors), window materials for aircraft, window materials for automatic vending machines, show window materials, and show case materials.

Since the optical members according to the present invention are excellent in heat resistance, they are most suitable for optical members used at high temperature, such as optical members installed in automobiles in particular. For example, a pickup lens for optical disk is a read-only objective lens for information having a function that collects light which is emitted from the side opposite to pits formed on the surface of an optical disk and reflected by a deposited aluminum film or the like and is required to have high transparency and low birefringence for exactly reading out information. Recently, a pickup lens used in CD for automobile has also been required to be little in heat distortion at high temperature.

The optical members making use of the molding material according to the present invention can be sufficiently used even when the norbornene polymer according to the present invention is used by itself. As needed, other polymeric materials and various additives may be compounded therein.

For example, when high impact resistance is required of optical members, sensor covers and CD for installing in an automobile, or high flexibility is required of optical fibers, it is preferable to compound a thermoplastic elastomer into the norbornene polymer in order to meet the required properties without lowering the heat resistance. More specifically, a hydrogenated styrene-butadiene block copolymer, hydrogenated styrene-isoprene block copolymers, hydrogenated styrene-butadiene random copolymer, ethylene-propylene elastomer or the like is used as the thermoplastic elastomer, whereby the impact resistance and flexibility can be enhanced while retaining the heat resistance. These thermoplastic elastomers may be used either singly or in any combination thereof. When the elastomer is compounded in a proportion of generally 0.0001 to 5 parts by weight, preferably 0.001 to 4 parts by weight, more preferably 0.01 to 3 parts by weight per 100 parts by weight of the norbornene polymer according to the present invention, the intended properties can be attained.

In order to further enhance durability without lowering the heat resistance, it is preferable to compound an antioxidant. In particular, the above-described phenolic antioxidants are preferred because the dispersibility in the norbornene polymer is good, and such an antioxidant is hard to cause deterioration of the transparency of the molded or formed product. The antioxidants may be used either singly or in any combination thereof. When the antioxidant is compounded in a proportion of generally 0.0001 to 10 parts by weight, preferably 0.001 to 5 parts by weight, more preferably 0.01 to 3 parts by weight per 100 parts by weight of the norbornene polymer according to the present invention, the intended properties can be attained.

In order to further enhance moldability upon processing without lowering the heat resistance, and particularly, prevent scorching within a cylinder and stick in mold upon injection molding, the above-described lubricants can be compounded. The lubricants may be used either singly or in any combination thereof. When the lubricant is compounded in a proportion of generally 0.0001 to 10 parts by weight, preferably 0.001 to 7 parts by weight, particularly preferably 0.01 to 5 parts by weight per 100 parts by weight of the norbornene polymer according to the present invention, the moldability can be improved.

When the molding or forming product according to the present invention is used as a light-diffusing optical member, an organic filler can be compounded. As the organic filler, transparent polymeric fine particles are particularly preferred. The compounding amount can be determined by the degree of diffusion required. When the molding or forming product according to the present invention is applied to use such as a specific sensor cover, a specified amount of a dye may also be compounded for the purpose of selecting transmitted light.

EXAMPLES

The present invention will hereinafter be described more specifically by reference to the following Preparation Examples, Examples and Comparative Examples. All designations of "part" or "parts" and "%" as will be used in these examples mean part or parts by weight and wt. % unless expressly noted.

Various physical properties of polymers were measured or determined in accordance with the following methods:
(1) The compositional ratio (molar ratio) of an endo form to an exo form in a norbornene monomer sample was determined by gas chromatography (GC).
(2) The glass transition temperature (Tg) was measured in accordance with the differential scanning calorimetry (DSC method).
(3) The molecular weight of a polymer sample before hydrogenation was determined in terms of polystyrene as measured by gel permeation chromatography (GPC) using toluene as a solvent.
(4) The molecular weight of a hydrogenated product sample of a polymer was determined in terms of polyisoprene as measured by GPC using cyclohexane as a solvent unless expressly noted.
(5) The rate of hydrogenation in the main chain, the rate of hydrogenation (rate of nuclear hydrogenation) in the aromatic ring and the rate of hydrogenation in the cyclohexene ring were determined by $^1$H-NMR.
(6) The peak area ratio "B/(A+B)" of a peak (A) appeared on the high magnetic field side to a peak (B) appeared on the low magnetic field side in a $^{13}$C-NMR spectrum as determined in heavy chloroform (TMS standard) was calculated from integrated values of the areas of the respective peaks appeared at 21–22 ppm for the high magnetic field side (A) and 22–22.5 ppm for the low magnetic field side (B) in these Examples.
(7) Norbornene polymers produced in Examples and Comparative Examples were pelletized by adding 0.4 parts by weight of a lubricant (KAO WAX 85-P; hardened castor oil; product of Kao Corporation), 0.4 parts by weight of an antioxidant [Irganox 1010; product of CIBA-GEIGY AB; tetrakis[methylene-3-(3',5'-di-t-butyl-4'-hydroxyphenyl)-propionate]methane] and 0.25 parts by weight of a hydrogenated styrene-butadiene block copolymer (Toughtec H1051D; product of Asahi Chemical Industry Co., Ltd.) to 100 parts by weight of each polymer and kneading the resultant mixture by a twin-screw kneader, thereby determining their physical properties.

The pellets were injection-molded at 350° C. to produce a molded plate of 100 mm in long, 100 mm in broad and 1 mm in thickness. The pellets were press-molded at 240° C. to produce a molded sheet of 50 mm long, 10 mm broad and 50 μm thick.
(8) The heat resistance test of a molded plate sample was conducted in the following manner. The molded plate produced in (7) was placed on a table of 150 mm long, 100 mm broad and 100 mm high in a Geer oven at 170° C. in such a manner that a half thereof projects in the air, and a weight for fixing the molded plate, which was 50 mm in length, 100 mm in width, 50 mm in thickness and 300 g in weight, was placed thereon to fix the plate. A weight which was 30 mm in diameter and 100 g in weight was further placed on the end of the molded plate, and the molded plate was left to stand for 10 minutes. Thereafter, the condition of the molded plate was observed to evaluate it as to the heat resistance in accordance with the following standard:
○: Not distorted;
Δ: Somewhat distorted:
X: Distorted, and the weight fell.
(9) The steam sterilization resistance test of a molded plate sample was conducted by placing the above-described molded plate in an autoclave at 140° C. to repeat a temperature cycle of "heated for 15 minutes→cooled to room temperature" 30 times in total to observe the condition of the molded plate after the test, thereby evaluating it as to the steam sterilization resistance in accordance with the following standard:
○: Good appearance (none of whitening, cracking and distortion were observed visually;

Δ: Good appearance, but whitening and distortion were observed;

X: The test sample underwent yellowing, whitening and distortion.

(10) The heat resistance test of a molded sheet sample was conducted in the following manner. The molded sheet produced in (7) was hung by clipping its upper part from a stand of 150 mm high for hanging a sample sheet in an autoclave at 160° C. The lower part of the molded sheet was held by a weighted clip so as to apply a load of 20 g to the molded sheet and then left to stand for 1 hour. The elongation of the sheet was then observed to evaluate it in accordance with the following standard:

○: Not distorted;

Δ: Somewhat elongated;

X: Elongated at least 10 mm.

Preparation Example 1
Preparation of Ring-opening Polymer)

In a polymerization reactor, 0.68 parts of 1-hexene, 0.25 parts of isopropyl ether, 0.18 parts of isobutyl alcohol, 0.48 parts of isobutylaluminum and 42 parts of a 0.77 wt. % toluene solution of tungsten hexachloride were added to 400 parts of dehydrated toluene at room temperature under a nitrogen atmosphere to mix them. To the polymerization reactor, were continuously added 200 parts of 1,4-methano-1,4,4a,9a-tetrahydrofluorene (MTF) the ratio of endo form to exo form of which was 85/15 (molar ratio), and 25 parts by weight of a 0.77 wt. % toluene solution of tungsten hexachloride at 45° C. over 2 hours to conduct polymerization. The number average molecular weight (Mn) and weight average molecular weight (Mw) of the resultant ring-opening polymer were 19,500 and 37,100, respectively, as measured by high performance liquid chromatography (in terms of polystyrene) using toluene as a solvent. The molecular weight distribution (Mw/Mn) was hence 1.90.

Example 1
(Hydrogenation)

The polymerization reaction solution (300 parts) prepared in Preparation Example 1 was transferred to an autoclave equipped with a stirrer, and 9 parts of a nickel catalyst on diatomaceous earth (G-96D, product of Nissan Girdler Catalyst Co., Ltd.; rate of nickel supported: 58 wt. %) were added to conduct a reaction at 150° C. for 10 hours under 45 kgf/cm$^2$. The resultant solution was filtered through filter paper having a pore size of 1 μm using diatomaceous earth as a filter aid. The resultant reaction solution was poured in 2,000 parts of isopropyl alcohol under stirring to precipitate a hydrogenated product, and the hydrogenated product was collected by filtration. The product was washed with 500 parts of acetone and then dried for 24 hours in a vacuum dryer set at 1 Torr and 100° C. to obtain a hydrogenated product of the ring-opening polymer. The yield was 99%.
(Physical properties of the polymer)

The rate of hydrogenation in the main chain (carbon-carbon double bond) of the thus-obtained hydrogenated product was 99.7%, the rate of hydrogenation in the 6-membered ring (benzene ring) in the side chain was 100%, the number average molecular weight (Mn) was 24,200, the weight average molecular weight (Mw) was 44,900, and the molecular weight distribution (Mw/Mn) was 1.86. The integral ratio "B/(A+B)" of the methylene peak areas as determined by the $^{13}$C-NMR spectrum of the hydrogenated product was 0.08. The results are shown collectively in Table 1.

Incidentally, the properties of the hydrogenated product, such as low birefringence, oil and grease resistance and low water absorption property were equivalent to the conventional polymers.

Example 2

The polymerization reaction solution (300 parts) prepared in Preparation Example 1 was transferred to an autoclave equipped with a stirrer, and 12 parts of a nickel catalyst on alumina (N163A; product of Nikki Chemical Co., Ltd.; rate of nickel supported: 35 wt. %) were added to conduct a reaction at 190° C. for 8 hours under 4.5 kgf/cm$^2$. The resultant solution was treated in the same manner as in Example 1 to obtain a hydrogenated product of the polymer. The yield was 99%.
(Physical properties of the polymer)

The rate of hydrogenation in the main chain of the thus-obtained hydrogenated product was 99.9%, and the rate of hydrogenation in the 6-membered ring in the side chain was 100%. The number average molecular weight (Mn) was 24,200, the weight average molecular weight (Mw) was 45,000, and the molecular weight distribution (Mw/Mn) was 1.86. The integral ratio "B/(A+B)" of the methylene peak areas as determined by the $^{13}$C-NMR spectrum of the hydrogenated product was 0.17. The results are shown collectively in Table 1.

Example 3
(Hydrogenation)

Polymerization and hydrogenation were conducted in the same manner as in Example 1 except that the reaction temperature was changed to 160° C., and a catalyst obtained by stirring 3 parts of a mixture of nickel acetylacetonate and triisobutylaluminum (Ni/Al=1/4; molar ratio) at 150° C. for 12 hours to age it was used as the catalyst, thereby obtaining a hydrogenated product. The yield was 99%.
(Physical properties of the polymer)

The rate of hydrogenation in the main chain of the thus-obtained hydrogenated product was 99.8%, the rate of hydrogenation in the 6-membered ring in the side chain was 100%, the number average molecular weight (Mn) was 24,700, the weight average molecular weight (Mw) was 45,200, and the molecular weight distribution (Mw/Mn) was 1.83. The integral ratio "B/(A+B)" of the methylene peak areas as determined by the $^{13}$C-NMR spectrum of the hydrogenated product was 0.12. The results are shown collectively in Table 1.

Preparation Example 2
(Preparation of ring-opening polymer)

In a polymerization reactor, 0.60 parts of 1-hexene, 0.25 parts of isopropyl ether, 0.18 parts of isobutyl alcohol, 0.48 parts of isobutylaluminum and 42 parts of a 0.77 wt. % toluene solution of tungsten hexachloride were added to 400 parts of dehydrated toluene at room temperature under a nitrogen atmosphere to mix them. To the polymerization reactor, were continuously added 200 parts of MTF the ratio of endo form to exo form of which was 98/2 (molar ratio), and 25 parts of a 0.77 wt. % toluene solution of tungsten hexachloride at 45° C. over 2 hours to conduct polymerization. The number average molecular weight (Mn) and weight average molecular weight (Mw) of the resultant ring-opening polymer were 24,200 and 43,400, respectively, as measured by high performance liquid chromatography (in terms of polystyrene) using toluene as a solvent. The molecular weight distribution (Mw/Mn) was hence 1.79.

Example 4

(Hydrogenation)

Hydrogenation was conducted in the same manner as in Example 2 except that the polymerization reaction solution prepared in Preparation Example 2 was used, thereby obtaining a hydrogenated product of the polymer. The yield was 99%.

(Physical properties of the polymer)

The rate of hydrogenation in the main chain of the thus-obtained hydrogenated product was 99.6%, the rate of hydrogenation in the 6-membered ring in the side chain was 100%, the number average molecular weight (Mn) was 27,900, the weight average molecular weight (Mw) was 49,200, and the molecular weight distribution (Mw/Mn) was 1.71. The integral ratio "B/(A+B)" of the methylene peak areas as determined by the $^{13}$C-NMR spectrum of the hydrogenated product was 0.03. The results are shown collectively in Table 1.

Preparation Example 3

(Preparation of ring-opening polymer)

In a polymerization reactor, 0.80 parts of 1-hexene, 0.25 parts of isopropyl ether, 0.18 parts of isobutyl alcohol, 0.48 parts of isobutylaluminum and 42 parts of a 0.77 wt. % toluene solution of tungsten hexachloride were added to 400 parts of dehydrated toluene at room temperature under a nitrogen atmosphere to mix them. To the polymerization reactor, were continuously added 200 parts of MTF the ratio of endo form to exo form of which was 85/15 (molar ratio), and 25 parts of a 0.77 wt. % toluene solution of tungsten hexachloride at 45° C. over 2 hours to conduct polymerization. The number average molecular weight (Mn) and weight average molecular weight (Mw) of the resultant ring-opening polymer were 14,300 and 24,800, respectively, as measured by high performance liquid chromatography (in terms of polystyrene) using toluene as a solvent. The molecular weight distribution (Mw/Mn) was hence 1.73.

Example 5

(Hydrogenation)

Hydrogenation was conducted in the same manner as in Example 1 except that the polymerization reaction solution prepared in Preparation Example 3 was used, thereby obtaining a hydrogenated product of the polymer. The yield was 99%.

(Physical properties of the polymer)

The rate of hydrogenation in the main chain of the thus-obtained hydrogenated product was 99.9%, the rate of hydrogenation in the 6-membered ring in the side chain was 100%, the number average molecular weight (Mn) was 14,700, the weight average molecular weight (Mw) was 25,900, and the molecular weight distribution (Mw/Mn) was 1.76. The integral ratio "B/(A+B)" of the methylene peak areas as determined by the $^{13}$C-NMR spectrum of the hydrogenated product was 0.18. The results are shown collectively in Table 1.

Comparative Example 11

(Hydrogenation)

Hydrogenation was conducted in the same manner as in Example 2 except that the polymerization reaction solution prepared in Preparation Example 2 was used to conduct a hydrogenation reaction at 230° C. for 12 hours, thereby obtaining a hydrogenated product. The yield was 99%.

(Physical properties of the polymer)

The rate of hydrogenation in the main chain of the thus-obtained hydrogenated product was 99.9%, and the rate of hydrogenation in the 6-membered ring in the side chain was 100%. The number average molecular weight (Mn) was 24,200, the weight average molecular weight (Mw) was 45,200, and the molecular weight distribution (Mw/Mn) was 1.87. The integral ratio "B/(A+B)" of the methylene peak areas as determined by the $^{13}$C-NMR spectrum of the hydrogenated product was 0.76. The results are shown collectively in Table 1.

Comparative Example 2

(Hydrogenation)

Hydrogenation was conducted in the same manner as in Comparative Example 1 except that a polymer prepared by using MTF the ratio of endo form to exo form of which was 20/80 (molar ratio) was used, thereby obtaining a hydrogenated product. The yield was 99%.

(Physical properties of the polymer)

The rate of hydrogenation in the main chain of the thus-obtained hydrogenated product was 99.8%, the rate of hydrogenation in the 6-membered ring in the side chain was 100%, the number average molecular weight (Mn) was 21,000, the weight average molecular weight (Mw) was 42,000, and the molecular weight distribution (Mw/Mn) was 2.00. The integral ratio "B/(A+B)" of the methylene peak areas as determined by the $^{13}$C-NMR spectrum of the hydrogenated product was 0.84. The results are shown collectively in Table 1.

Preparation Example 4

(Preparation of ring-opening polymer)

In a polymerization reactor, 0.68 parts of 1-hexene, 0.25 parts of isopropyl ether, 0.18 parts of isobutyl alcohol, 0.48 parts of isobutylaluminum and 42 parts of a 0.77 wt. % toluene solution of tungsten hexachloride were added to 400 parts of dehydrated toluene at room temperature under a nitrogen atmosphere to mix them. To the polymerization reactor, were continuously added 100 parts of MTF the ratio of endo form to exo form of which was 85/15 (molar ratio), 100 parts of tetracyclo-[4.4.0.1$^{2,5}$.1$^{7,10}$]-3-dodecene (TCD), and 25 parts of a 0.77 wt. % toluene solution of tungsten hexachloride at 45° C. over 2 hours to conduct polymerization. The number average molecular weight (Mn) and weight average molecular weight (Mw) of the resultant ring-opening copolymer were 20,400 and 44,600, respectively, as measured by high performance liquid chromatography (in terms of polystyrene) using toluene as a solvent. The molecular weight distribution (Mw/Mn) was hence 2.19.

Example 6

(Hydrogenation)

The polymerization reaction solution (300 parts) prepared in Preparation Example 4 was transferred to an autoclave equipped with a stirrer, and 9 parts of the above-described nickel catalyst on alumina were added to conduct a reaction at 190° C. for 8 hours under 45 kgf/cm$^2$. The resultant solution was treated in the same manner as in Example 1 to obtain a hydrogenated product. The yield was 99%.

(Physical properties of the polymer)

The rate of hydrogenation in the main chain of the thus-obtained hydrogenated product was 99.9%, the rate of hydrogenation in the 6-membered ring In the side chain was 100%, the number average molecular weight (Mn) was 25,900, the weight average molecular weight (Mw) was 53,400, and the molecular weight distribution (Mw/Mn) was 2.06. The integral ratio "B/(A+B)" of the methylene peak areas as determined by the $^{13}$C-NMR spectrum of the hydrogenated product was 0.15. The results are shown collectively in Table 1.

Example 7
(Hydrogenation)

A polymerization reaction solution (300 parts) prepared in the same manner as in Preparation Example 4 except that 80 parts of MTF and 120 parts of TCD were used was transferred to an autoclave equipped with a stirrer, and 6 parts of the above-described nickel catalyst on diatomaceous earth were added to conduct a reaction at 150° C. for 10 hours under 45 kgf/cm$^2$. The resultant solution was treated in the same manner as in Example 1 to obtain a hydrogenated product of the copolymer. The yield was 99%.

(Physical properties of the polymer)

The rate of hydrogenation in the main chain of the thus-obtained hydrogenated product was 99.9%, the rate of hydrogenation in the 6-membered ring in the side chain was 100%, the number average molecular weight (Mn) was 20,800, the weight average molecular weight (Mw) was 47,200, and the molecular weight distribution (Mw/Mn) was 2.27. The integral ratio "B/(A+B)" of the methylene peak areas as determined by the $^{13}$C-NMR spectrum of the hydrogenated product was 0.04.. The results are shown collectively in Table 1.

Example 8
(Hydrogenation)

A polymerization reaction solution (300 parts) prepared in the same manner as in Preparation Example 4 except that 180 parts of MTF and 20 parts of TCD were used was transferred to an autoclave equipped with a stirrer, and 8 parts of the above-described nickel catalyst on diatomaceous earth were added to conduct a reaction at 150° C. for 10 hours under 45 kgf/cm$^2$. The resultant solution was treated in the same manner as in Example 1 to obtain a hydrogenated product of the copolymer. The yield was 99%.

(Physical properties of the polymer)

The rate of hydrogenation in the main chain of the thus-obtained hydrogenated product was 99.9%, the rate of hydrogenation in the 6-membered ring in the side chain was 100%, the number average molecular weight (Mn) was 23,700, the weight average molecular weight (Mw) was 48,100, and the molecular weight distribution (Mw/Mn) was 2.03. The integral ratio "B/(A+B)" of the methylene peak areas as determined by the $^{13}$C-NMR spectrum of the hydrogenated product was 0.08. The results are shown collectively in Table 1.

Example 9
(Hydrogenation)

Ring-opening polymerization was conducted in the same manner as in Preparation Example 1 except that 1,4-methano-1,4,4a,4b,5,8,8a,9a-octahydro-9H-fluorene (MOF) the ratio of endo form to exo form of which was 90/10 (molar ratio) was used in place of MTF. A polymerization reaction solution (300 parts) prepared in this manner was transferred to an autoclave equipped with a stirrer, and 8 parts of the above-described nickel catalyst on diatomaceous earth were added to conduct a reaction at 150° C. for 10 hours under 45 kgf/cm$^2$. The resultant solution was treated in the same manner as in Example 1 to obtain a hydrogenated product of the copolymer. The yield was 99%.

(Physical properties of the polymer)

The rate of hydrogenation in the main chain of the thus-obtained hydrogenated product was 100%, the rate of hydrogenation in the 6-membered ring in the side chain was 100%, the number average molecular weight (Mn) was 24,800, the weight average molecular weight (Mw) was 45,900, and the molecular weight distribution (Mw/Mn) was 1.85. The integral ratio "B/(A+B)" of the methylene peak areas as determined by the $^{13}$C-NMR spectrum of the hydrogenated product was 0.07. The results are shown collectively in Table 1.

Example 10
(Hydrogenation)

A polymerization reaction solution (300 parts) prepared in the same manner as in Preparation Example 4 except that 180 parts of MOF and 20 parts of TCD were used was transferred to an autoclave equipped with a stirrer, and 8 parts of the above-described nickel catalyst on diatomaceous earth were added to conduct a reaction at 150° C. for 10 hours under 45 kgf/cm$^2$. The resultant solution was treated in the same manner as in Example 1 to obtain a hydrogenated product of the copolymer. The yield was 99%.

(Physical properties of the polymer)

The rate of hydrogenation in the main chain of the thus-obtained hydrogenated product was 100%, the rate of hydrogenation in the 6-membered ring in the side chain was 100%, the number average molecular weight (Mn) was 24,500, the weight average molecular weight (Mw) was 50,200, and the molecular weight distribution (Mw/Mn) was 2.05. The integral ratio "B/(A+B)" of the methylene peak areas as determined by the $^{13}$C-NMR spectrum of the hydrogenated product was 0.06. The results are shown collectively in Table 1.

Comparative Example 3
(Hydrogenation)

Hydrogenation was conducted in the same manner as in Comparative Example 1 except that the hydrogenation reaction time was changed to 7 hours, thereby obtaining a hydrogenated product of the polymer. The yield was 99%.

(Physical properties of the polymer)

The rate of hydrogenation in the main chain of the thus-obtained hydrogenated product was 99.4%, the rate of hydrogenation in the 6-membered ring in the side chain was 100%, the number average molecular weight (Mn) was 24,000, the weight average molecular weight (Mw) was 44,800, and the molecular weight distribution (Mw/Mn) was 1.87. The integral ratio "B/(A+B)" of the methylene peak areas as determined by the $^{13}$C-NMR spectrum of the hydrogenated product was 0.50. The results are shown collectively in Table 1.

TABLE 1

| | Polymer before hydrogenation | | | | Polymer after hydrogenation | | | | | | Molded plate | | Molded sheet |
|---|---|---|---|---|---|---|---|---|---|---|---|---|---|
| | Monomer composition (wt. %) | | | Endo form/ Exo form | Temp. of hydg. | Hydrogenation rate (%) | | Mn | Mw/Mn | Tg (° C.) | Peak area ratio [B/(A + B)] by $^{13}$C-NMR | Heat resistance test | Steam sterilization resistance test | Heat resistance test |
| | MTF | MOF | TCD | | | Main chain | 6-memd. ring | | | | | | | |
| Ex. 1 | 100 | 0 | 0 | 85/15 | 150 | 99.7 | 100 | 24,200 | 1.86 | 166 | 0.08 | ◯ | ◯ | ◯ |
| Ex. 2 | 100 | 0 | 0 | 85/15 | 190 | 99.9 | 100 | 24,200 | 1.86 | 161 | 0.17 | ◯ | ◯ | ◯ |
| Ex. 3 | 100 | 0 | 0 | 85/15 | 160 | 99.8 | 100 | 24,700 | 1.83 | 165 | 0.12 | ◯ | ◯ | ◯ |

TABLE 1-continued

| | Polymer before hydrogenation | | | | Polymer after hydrogenation | | | | | | | Molded plate | | Molded sheet Heat resistance test |
|---|---|---|---|---|---|---|---|---|---|---|---|---|---|---|
| | Monomer composition (wt. %) | | | Endo form/ Exo form | Temp. of hydg. | Hydrogenation rate (%) | | Mn | Mw/Mn | Tg (° C.) | Peak area ratio [B/(A + B)] by $^{13}$C-NMR | Heat resistance test | Steam sterilization resistance test | |
| | MTF | MOF | TCD | | | Main chain | 6-memd. ring | | | | | | | |
| Ex. 4 | 100 | 0 | 0 | 98/2 | 190 | 99.6 | 100 | 27,900 | 1.71 | 177 | 0.03 | ○ | ○ | ○ |
| Ex. 5 | 100 | 0 | 0 | 85/15 | 150 | 99.9 | 100 | 14,700 | 1.76 | 161 | 0.18 | ○ | ○ | ○ |
| Comp. Ex. 1 | 100 | 0 | 0 | 98/2 | 230 | 99.9 | 100 | 24,200 | 1.87 | 135 | 0.76 | X | X | X |
| Comp. Ex. 2 | 100 | 0 | 0 | 26/80 | 230 | 99.8 | 100 | 21,000 | 2.00 | 130 | 0.84 | X | X | X |
| Ex. 6 | 50 | 0 | 50 | 85/15 | 190 | 99.9 | 100 | 25,900 | 2.06 | 162 | 0.15 | ○ | ○ | ○ |
| Ex. 7 | 40 | 0 | 60 | 85/15 | 150 | 99.9 | 100 | 20,800 | 2.27 | 164 | 0.04 | ○ | ○ | ○ |
| Ex. 8 | 90 | 0 | 10 | 85/15 | 150 | 99.9 | 100 | 23,700 | 2.03 | 164 | 0.08 | ○ | ○ | ○ |
| Ex. 9 | 0 | 100 | 0 | 90/10 | 150 | 100 | 100 | 24,800 | 1.85 | 161 | 0.07 | ○ | ○ | ○ |
| Ex. 10 | 0 | 90 | 10 | 90/10 | 150 | 100 | 100 | 24,500 | 2.05 | 162 | 0.06 | ○ | ○ | ○ |
| Comp. Ex. 3 | 100 | 0 | 0 | 98/2 | 230 | 99.4 | 100 | 24,000 | 1.87 | 141 | 0.50 | Δ | Δ | X |

As apparent from the results shown in Table 1, the molded products obtained by using the norbornene polymers the peak area ratios by $^{13}$C-NMR of which satisfy B/(A+B) ≦0.30 have sufficient heat resistance, and excellent evaluation was given in the respective heat resistance tests.

Incidentally, the properties of the hydrogenated product obtained in Examples 2 to 10 and Comparative Examples 1 to 3, such as low birefringence, oil and grease resistance and low water absorption property were equivalent to the conventional polymers like that in Example 1.

INDUSTRIAL APPLICABILITY

The norbornene polymers according to the present invention are not only excellent in transparency, low birefringence, oil and grease resistance, and low water absorption property, which are characteristics of the conventional norbornene polymers, but also far excellent in heat resistance, are extremely little in distortion at high temperature, and are hence suitable for use as molding materials and molded or formed products at high temperature in particular in medical, electric electronic, and optical fields.

What is claimed is:

1. A norbornene polymer comprising a repeating unit derived from a norbornene monomer having a cyclic hydrocarbon structure (I) derived from the norbornene ring which constitutes at least a part of the main chain, another cyclic hydrocarbon structure (II), which shares one carbon-carbon bond with the cyclic hydrocarbon structure (I) and has 4 to 6 carbon atoms, and a monocyclic or polycyclic hydrocarbon structure (III), which shares one carbon-carbon bond with the cyclic hydrocarbon structure (II), in a proportion of 20 to 100 mol % based on the whole repeating unit of the polymer, wherein the number average molecular weight is within a range of 1,000 to 1,000,000, and a peak area (A) on a high magnetic field side and a peak area (B) on a low magnetic field side in methylene peaks derived from the methylene groups in the cyclic hydrocarbon structure (III) in a $^{13}$C-NMR spectrum as determined in heavy chloroform (TMS standard) satisfy a relationship of the expression:

$$B/(A+B) \leq 0.30.$$

2. The norbornene polymer according to claim 1, which is a hydrogenated product of a thermoplastic norbornene addition polymer.

3. The norbornene polymer according to claim 1, which is a hydrogenated product of a thermoplastic norbornene ring-opening polymer.

4. The norbornene polymer according to claim 1, wherein the cyclic hydrocarbon structure (II) has a saturated and fused alicyclic structure.

5. The norbornene polymer according to claim 1, wherein the cyclic hydrocarbon structure (III) has a saturated and fused alicyclic structure.

6. The norbornene polymer according to claim 5, wherein the saturated and fused alicyclic structure is a cyclohexane ring.

7. The norbornene polymer according to claim 1, wherein the repeating unit derived from the norbornene monomer is represented by the formula (1):

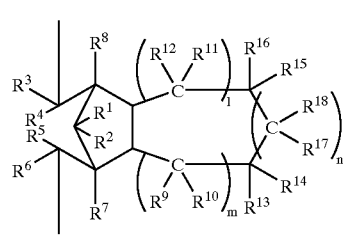

(1)

wherein
l and m are individually 0, 1 or 2;
n is 0, 1 or 2;
l+m+n≦2;
$R^1$, $R^2$ and $R^7$ to $R^{18}$ are independently a hydrogen atom, hydrocarbon group, halogen atom, hydroxyl group, ester group, alkoxy group, cyano group, amide group, imide group or silyl group, or a hydrocarbon group substituted by a polar group (a halogen atom, hydroxyl group, ester group, alkoxy group, cyano group, amide group, imide group or silyl group), with the proviso that:
$R^{14}$ and $R^{15}$ are bonded to each other to form a monocyclic or polycyclic hydrocarbon structure when n is 0;
any one or both of $R^{14}$ and $R^{17}$, and $R^{15}$ and $R^{18}$ are bonded to each other to form a monocyclic or polycyclic hydrocarbon structure when n is 1 or 2, provided that when both $R^{14}$ and $R^{17}$, and $R^{15}$ and $R^{18}$ are bonded to each other to form a cyclic hydrocarbon structure, the cyclic hydrocarbon structure may be a fused polycycle which shares at least one carbon-carbon bond with each other; and $R^3$ to $R^6$ are all hydrogen atoms, or $R^4$ and $R^5$ among them may form a single bond together, and in this case, both $R^3$ and $R^6$ are hydrogen atoms.

8. The norbornene polymer according to claim 7, wherein the repeating unit derived from the norbornene monomer is represented by the formula (9):

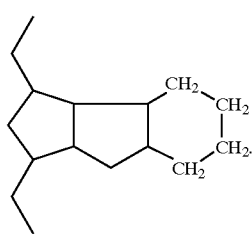

(9)

9. The norbornene polymer according to claim 1, which comprises 20 to 100 mol % of the repeating unit represented by the formula (1) derived from the norbornene monomer, and 0 to 80 mol % of a repeating unit derived from any other monomer copolymerizable with the norbornene monomer.

10. The norbornene polymer according to claim 1, which is a hydrogenated product of a ring-opening polymer of a tetrahydrofluorene selected from among 1,4-methano-1,4,4a,9a-tetrahydrofluorene and substituted derivatives thereof.

11. The norbornene polymer according to claim 1, which is a hydrogenated product of a ring-opening polymer of a octahydrofluorene selected from among 1,4-methano-1,4,4a,4b,5,8,8a,9a-octahydro-9H-fluorene and substituted derivatives thereof.

12. The norbornene polymer according to claim 1, which is a hydrogenated product of a ring-opening copolymer of a tetrahydrofluorene selected from among 1,4-methano-1,4,4a,9a-tetrahydrofluorene and substituted derivatives thereof with a tetrahydrododecene selected from among tetracyclo $[4.4.0.1^{2,5}.1^{7,10}]$-3-dodecene and substituted derivatives thereof.

13. A process for producing the norbornene polymer according to claim 1, which comprises polymerizing a monomer or monomer mixture comprising 20 to 100 mol % of a norbornene monomer (i) of a fused polycyclic structure having a norbornene ring structure (IA), a cyclic hydrocarbon structure (IIA), which shares one carbon-carbon bond with the norbornene ring structure (IA) and has 4 to 6 carbon atoms, and a monocyclic or polycyclic hydrocarbon structure (IIIA), which shares one carbon-carbon bond with the cyclic hydrocarbon structure (IIA) and has at least one carbon-carbon unsaturated bond in its ring, the compositional ratio (a:b) between an endo form (a) and an exo form (b) which are stereoisomers of said norbornene monomer being within a range of 70:30 to 100:0, and 0 to 80 mol % of any other monomer (ii) copolymerizable with the norbornene monomer, and then hydrogenating the resultant polymer at a temperature of 200° C. or lower.

14. The production process according to claim 13, which comprises subjecting the monomer or monomer composition to ring-opening (co)polymerization and then saturating at least 80 mol % of the carbon-carbon double bond in the main chain and at least 50 mol % of the monocyclic or polycyclic hydrocarbon structure (IIIA) having at least one carbon-carbon unsaturated bond in the ring of the side chain by hydrogenation.

15. The production process according to claim 13, which comprises subjecting the monomer or monomer composition to addition (co)polymerization and then saturating at least 50 mol % of the monocyclic or polycyclic hydrocarbon structure (IIIA) having at least one carbon-carbon unsaturated bond in the ring of the side chain by hydrogenation.

16. The production process according to claim 13, wherein the norbornene monomer (i) is a compound represented by the formula (2):

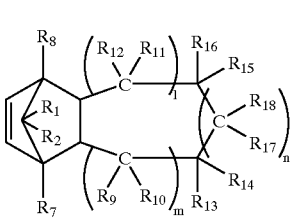

(2)

wherein l and m are individually 0, 1 or 2;

n is 0, 1 or 2;

l+m+n≦2; and $R_1$, $R_2$ and $R_7$ to $R_{18}$ are independently a hydrogen atom, hydrocarbon group, halogen atom, hydroxyl group, ester group, alkoxy group, cyano group, amide group, imide group or silyl group, or a hydrocarbon group substituted by a polar group (a halogen atom, hydroxyl group, ester group, alkoxy group, cyano group, amide group, imide group or silyl group), with the proviso that:

$R_{14}$ and $R_{15}$ are bonded to each other to form a monocyclic or polycyclic hydrocarbon structure having at least one carbon-carbon unsaturated bond in its ring when n is 0;

any one or both of $R_{14}$ and $R_{17}$, and $R_{15}$ and $R_{18}$ are bonded to each other to form a monocyclic or polycyclic hydrocarbon structure having at least one carbon-carbon unsaturated bond in its ring when n is 1 or 2, provided that when both $R_{14}$ and $R_{17}$, and $R_{15}$ and $R_{18}$ are bonded to each other to form a cyclic hydrocarbon structure, the cyclic hydrocarbon structure may be a fused polycycle which shares at least one carbon-carbon bond with each other.

17. The production process according to claim 16, wherein the compound represented by the formula (2) is a tetrahydrofluorene selected from among 1,4-methano-1,4,4a,9a-tetrahydrofluorene represented by the formula (5):

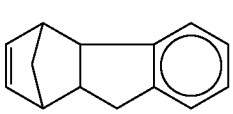

(5)

and substituted derivatives thereof.

18. The production process according to claim 16, wherein the compound represented by the formula (2) is a tetrahydrofluorene selected from among 1,4-methano-1,4,4a,4b,5,8,8a,9a-octahydro-9H-fluorene represented by the formula (6):

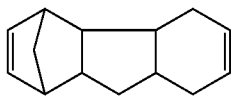 (6)

and substituted derivatives thereof.

19. The production process according to claim 13, wherein said any other monomer (ii) is another norbornene monomer (iii) than the norbornene monomer (i).

20. The production process according to claim 19, wherein the norbornene monomer (iii) is a tetrahydrododecene selected from among tetracyclo-$[4.4.0.1^{2,5}.1^{7,10}]$-3-dodecene represented by the formula (10):

 (10)

and substituted derivatives thereof.

21. A molding material comprising the norbornene polymer according to claim 1.

22. The molding material according to claim 21, which is a resin composition comprising the norbornene polymer and at least one compounding additive selected from the group consisting of rubbery polymers, other thermoplastic resins, stabilizers, lubricants, inorganic fine particles, ultraviolet absorbents, antistatic agents, fillers, flame retardants, flame retardant auxiliaries, pigments, dyes, anti-fogging agents, compatibilizers, slip agents, anti-blocking agents, natural oil, synthetic oil, wax, plasticizers, crosslinking agents and crosslinking.

23. The molding material according to claim 22, wherein the resin composition comprises a thermoplastic elastomer as the rubbery polymer.

24. The molding material according to claim 22, wherein the resin composition comprises an antioxidant as the stabilizer.

25. The molding material according to claim 22, wherein the resin composition comprises a lubricant.

26. The molding material according to claim 22, wherein the resin composition comprises a flame retardant.

27. The molding material according to claim 22, wherein the resin composition comprises a crosslinking agent.

28. The molding material according to claim 22, wherein the resin composition comprises an organic filler or inorganic filler as the filler.

29. A molded or formed product formed of the molding material according to claim 21.

30. The molded or formed product according to claim 29, which is a medical equipment, electrical insulating member, electronic part treating equipment or optical member.

31. The norbornene polymer according to claim 1, wherein the glass transition temperature of the norbornene polymer is at least 145° C.

* * * * *